United States Patent
Zhang

(10) Patent No.: US 10,626,300 B2
(45) Date of Patent: Apr. 21, 2020

(54) CURABLE ADHESIVE COMPOSITION, PRESSURE-SENSITIVE ADHESIVE, AND THE METHOD FOR MAKING THE SAME

(71) Applicant: 3M INNOVATIVE PROPERTIES COMPANY, St. Paul, MN (US)

(72) Inventor: Wenjie Zhang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 122 days.

(21) Appl. No.: 16/066,720

(22) PCT Filed: Dec. 15, 2016

(86) PCT No.: PCT/US2016/066760
§ 371 (c)(1),
(2) Date: Jun. 28, 2018

(87) PCT Pub. No.: WO2017/116723
PCT Pub. Date: Jul. 6, 2017

(65) Prior Publication Data
US 2019/0002734 A1 Jan. 3, 2019

(30) Foreign Application Priority Data

Dec. 31, 2015 (CN) .......................... 2015 1 1032196

(51) Int. Cl.
| | | |
|---|---|---|
| *C09J 4/06* | (2006.01) | |
| *C09J 133/08* | (2006.01) | |
| *C08L 33/08* | (2006.01) | |
| *C09J 11/08* | (2006.01) | |

(52) U.S. Cl.
CPC ................. *C09J 4/06* (2013.01); *C08L 33/08* (2013.01); *C09J 11/08* (2013.01); *C09J 133/08* (2013.01)

(58) Field of Classification Search
CPC .. C09J 4/06; C09J 133/08; C09J 11/08; C08L 33/08
See application file for complete search history.

(56) References Cited

U.S. PATENT DOCUMENTS

| | | |
|---|---|---|
| 4,330,590 A | 5/1982 | Vesley |
| 4,391,687 A | 7/1983 | Vesley |
| 4,737,559 A | 4/1988 | Kellen |
| 5,141,790 A | 8/1992 | Calhoun |
| 5,296,277 A | 3/1994 | Wilson |
| 5,362,516 A | 11/1994 | Wilson |
| 5,689,795 A * | 11/1997 | Mastrandrea ............ B65H 5/00 271/202 |
| 6,805,954 B2 | 10/2004 | Silverberg |
| 7,312,265 B2 * | 12/2007 | Wada ..................... C09J 133/04 524/272 |
| 8,263,711 B2 | 9/2012 | Krepski |
| 8,524,836 B2 | 9/2013 | Kavanagh |
| 9,376,599 B2 * | 6/2016 | Welke ......................... C08J 3/28 |
| 10,208,232 B2 * | 2/2019 | Wang ...................... C09J 133/10 |
| 2003/0008140 A1 | 1/2003 | Takizawa |
| 2009/0229733 A1 | 9/2009 | Kishioka |
| 2010/0098962 A1 | 4/2010 | Hanley |
| 2010/0136321 A1 | 6/2010 | Uesugi |
| 2011/0104486 A1 | 5/2011 | Ma |

FOREIGN PATENT DOCUMENTS

| | | |
|---|---|---|
| WO | WO 2013-074446 | 5/2013 |
| WO | WO 2015-143649 | 10/2015 |

OTHER PUBLICATIONS

International Search Report for PCT International Application No. PCT/US2016/066760, dated Mar. 14, 2017, 4 pages.

\* cited by examiner

*Primary Examiner* — Sanza L. McClendon
(74) *Attorney, Agent, or Firm* — Steven A. Bern

(57) ABSTRACT

Curable adhesive compositions that can be used to prepare the pressure-sensitive adhesives, and methods of making the pressure-sensitive adhesives are provided. More particularly, the pressure-sensitive adhesives contain (a) a (meth)acrylate copolymer having a weight average molecular weight greater than 500,000 grams/mole (Daltons), (b) a high glass transition temperature (meth)acrylate polymer tackifier having a Tg of at least 5° C. and (c) a low glass transition temperature (meth)acrylate polymer tackifier having a Tg no greater than 0° C. The pressure-sensitive adhesives advantageously are prepared by ultraviolet (UV) curing a curable adhesive composition that contains minimal or no organic solvents.

30 Claims, No Drawings

US 10,626,300 B2

CURABLE ADHESIVE COMPOSITION, PRESSURE-SENSITIVE ADHESIVE, AND THE METHOD FOR MAKING THE SAME

CROSS REFERENCE TO RELATED APPLICATIONS

This application is a national stage filing under 35 U.S.C. 371 of PCT/US2016/066760, filed Dec. 15, 2016, which claims the benefit of CN Application No. 201511032196.3, filed Dec. 31, 2015, the disclosure of which is incorporated by reference in their entirety herein.

FIELD OF THE INVENTION

The present disclosure relates to curable adhesive composition, pressure-sensitive adhesive, and the method for making the same.

BACKGROUND OF THE INVENTION

Pressure-sensitive adhesive (PSA) tapes are virtually ubiquitous in the home and workplace. In one of its simplest configurations, a pressure-sensitive tape includes a backing layer and an adhesive layer attached to the backing layer. According to the Pressure-Sensitive Tape Council, pressure-sensitive adhesives are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., about 20° C. to 25° C.). Materials that are merely sticky or adhere to a surface do not constitute a PSA; the term PSA encompasses materials with additional viscoelastic properties.

Acrylic-based pressure-sensitive adhesives have been widely used. These pressure-sensitive adhesives can be organic solvent-containing or organic solvent-free. PSA compositions containing organic solvents, while currently dominant in the marketplace are decreasing in importance due to the associated problems of pollution and high energy consumption associated with the use of organic solvents. That is, the adhesive industry is increasingly focused on the organic solvent free-type pressure-sensitive adhesives. PSA compositions that are organic solvent-free can be classified as emulsion type adhesives, hot melt type adhesives, or ultraviolet cured type adhesives.

With increased use of solvent-free PSA compositions, especially in the industrial fields, the performance requirements, especially for adhesion, have increased. The traditional paths for effectively enhancing the adhesion of acrylic-based PSA include adding a plasticizer or a traditional tackifier into the formulation. Plasticizers have been less commonly used than tackifiers due to process limitations, raw material issues, and stability issues. Presently, the common tackifiers used are mainly rosin resins, terpene resins, petroleum resins, aromatic resins, and the like. While these common tackifiers have been widely used, they typically have not been used for pressure-sensitive adhesives cured by ultraviolet radiation. That is, these common tackifiers tend to absorb a significant amount of ultraviolet radiation and tend to substantively inhibit the polymerization reaction, which in turn can adversely impact the performance of the resulting PSA. For example, phase separation can occur between the adhesive and tackifier and poor cohesion force can result from the low molecular weight and low percent curing of adhesive polymer.

Many attempts have been made seeking tackifiers that are suitable for use in acrylic PSA compositions that are cured by ultraviolet radiation. The tackifiers used typically have been hydrogenated rosin resins or aromatics synthetic resin but these tackifiers have considerable limitation such as high cost and limited ability to enhance the performance of the pressure-sensitive adhesives.

SUMMARY OF THE INVENTION

Thus, new pressure-sensitive adhesives are needed that can be prepared by ultraviolet curing, with low energy consumption, with high speed and efficiency, and without (or with minimal amounts of) organic solvents.

A pressure-sensitive adhesive is provided that includes an acid-functionalized (meth)acrylate copolymer, a high glass transition temperature (meth)acrylate polymer tackifier and a low glass transition temperature (meth)acrylate polymer tackifier. The pressure-sensitive adhesive is formed from a reaction mixture containing a first syrup polymer comprising a partially polymerized acid-functionalized (meth)acrylate copolymer, a high glass transition temperature (meth)acrylate polymer tackifier, a low glass transition temperature (meth)acrylate polymer tackifier, and an ultraviolet photoinitiator. Surprisingly, the pressure-sensitive adhesives can be prepared using ultraviolet radiation and without using organic solvents (or, alternatively, with minimal amounts of organic solvents). The process used to form the PSA can have low energy consumption, high speed, and high efficiency.

A first aspect relates to a curable adhesive composition that includes (a) a first syrup polymer formed from a first reaction mixture, (b) a high glass transition temperature (meth)acrylate polymer tackifier having a Tg of at least 5° C., (c) a low glass transition temperature (meth)acrylate polymer tackifier having a Tg no greater than 0° C. and (d) an ultraviolet photoinitiator. The first reaction mixture used to form the first syrup polymer contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture.

A second aspect relates to a cured adhesive composition that is an ultraviolet cured reaction product of a curable adhesive composition. The curable adhesive composition includes (a) a first syrup polymer formed from a first reaction mixture, (b) a high glass transition temperature (meth)acrylate polymer tackifier having a Tg of at least 5° C., (c) a low glass transition temperature (meth)acrylate polymer tackifier having a Tg no greater than 0° C. and (d) an ultraviolet photoinitiator. The first reaction mixture used to form the first syrup polymer contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture. The cured adhesive composition is a pressure-sensitive adhesive.

A third aspect relates to a pressure-sensitive adhesive that includes (a) an acid-functionalized (meth)acrylate copolymer having a weight average molecular weight (Mw) greater than 500,000 grams/mole (Daltons), (b) a high glass transition temperature (meth)acrylate polymer tackifier having a Tg of at least 5° C. and (c) a low glass transition temperature (meth)acrylate polymer tackifier having a Tg no greater than 0° C.

A fourth aspect of the invention relates to a method of making a pressure-sensitive adhesive. The method includes forming a first syrup polymer from a first reaction mixture that contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture. The method further includes providing a high glass transition temperature (meth)acrylate polymer tackifier having a Tg of at least 5° C. and a low glass transition temperature (meth)acrylate polymer tackifier having a Tg no greater than 0° C. The method still further includes combining the first syrup polymer, the high glass transition temperature (meth)acrylate polymer tackifier, the low glass transition temperature (meth)acrylate polymer tackifier and an ultraviolet photoinitiator to prepare a curable adhesive composition and then curing the curable adhesive composition with ultraviolet radiation to prepare a cured adhesive composition that is the pressure-sensitive adhesive.

The present methods of preparing the pressure-sensitive adhesives feature low energy consumption, high speed in applying, without (or with minimal amounts of) organic solvents. The present pressure-sensitive adhesives have good adhesiveness and high temperature shearing properties.

DETAILED DESCRIPTION

Pressure-sensitive adhesives, curable adhesive compositions that can be used to prepare the pressure-sensitive adhesives, and methods of making the pressure-sensitive adhesives are provided. More particularly, the pressure-sensitive adhesives contain (a) an acid-functionalized (meth) acrylate copolymer having a weight average molecular weight greater than 500,000 grams/mole (Daltons), (b) a high glass transition temperature (meth)acrylate polymer tackifier having a Tg of at least 5° C. and (c) a low glass transition temperature (meth)acrylate polymer tackifier having a Tg no greater than 0° C. The pressure-sensitive adhesives advantageously are prepared by ultraviolet (UV) curing a curable adhesive composition that contains minimal or no organic solvents.

As used herein, the terms "polymer" and "polymeric" and "polymerized product" refer to materials that are homopolymers, copolymers, terpolymers, and the like. As used herein, the terms "copolymer" and "copolymeric" refer to a polymeric material that is formed from at least two monomers. That is, a copolymer is a subset of polymers that excludes only homopolymers.

As used herein, the term "syrup polymer" refers to a composition formed by partially but not completely polymerizing a reaction mixture containing one or more types of monomers. That is, the syrup polymer contains a partially polymerized polymeric material plus the remaining monomers that have not undergone polymerization (i.e., un-reacted monomers). The partially polymerized polymeric material is soluble in the remaining monomers and can be referred to as a solute polymer. The partially polymerized polymeric material is typically not crosslinked or has such a small amount of crosslinking that its solubility in the remaining monomers is not adversely affected. That is, the syrup polymer is usually a single phase. The partially polymerized product is typically at least 1 percent polymerized, at least 5 percent polymerized, at least 10 percent polymerized, at least 15 percent polymerized, or at least 20 percent polymerized. The partially polymerized product can have any desired amount of polymerization provided that there are remaining monomers have not undergone polymerization and the remaining monomers form a single phase with the partially polymerized polymeric material.

As used herein, the term "(meth)acrylate" refers to both methacrylate and acrylate monomers. Likewise, the term "(meth)acrylic" refers to both acrylic and methacrylic materials.

The term "glass transition temperature" or "Tg" refers to the temperature at which a material changes from a glassy state to a rubbery state. In this context, the term "glassy" means that the material is hard and brittle (and therefore relatively easy to break) while the term "rubbery" means that the material is elastic and flexible. For polymeric materials, the Tg is the critical temperature that separates their glassy and rubbery behaviors. If a polymeric material is at a temperature below its Tg, large-scale molecular motion is severely restricted because the material is essentially frozen. On the other hand, if the polymeric material is at a temperature above its Tg, molecular motion on the scale of its repeat unit takes place, allowing it to be soft or rubbery. The glass transition temperature of a polymeric material is often determined using methods such as Differential Scanning calorimetry. Any reference herein to the Tg of a monomer refers to the Tg of a homopolymer prepared from that monomer. The Tg's referred to throughout the application were determined using the technique disclosed below in the examples section.

When referring to a range, the endpoints of the range are considered to be in the range. For example, the expressions "in a range from x to y", "in a range of x to y", "in an amount from x to y", "in an amount of x to y", or similar expressions include the endpoints x and y.

First Syrup Polymer: Preparation of Partially Polymerized Acid-Functionalized (Meth)Acrylate Copolymer The acid-functionalized (meth)acrylate copolymer is prepared from a first reaction mixture. The first reaction mixture contains a plurality of monomers. More specifically, the first reaction mixture can include the following monomers: (a) a non-tertiary alkyl acrylate, (b) an acid-functionalized ethylenically unsaturated monomer, (c) an optional high Tg (meth)acrylate monomer whose Tg is higher than the Tg value of the non-tertiary alkyl acrylate monomer, (d) an optional non-acidic ethylenically unsaturated polar monomer, (e) optional other vinyl monomers, and (f) an optional multi-functional (meth)acrylate monomer. An initiator (e.g., polymerization initiator) is typically added to the first reaction mixture. This initiator is usually a photoinitiator such as an ultraviolet photoinitiator. The first reaction mixture is typically partially but not completely polymerized to prepare a first syrup polymer. That is, the first syrup polymer contains a partially polymerized acid-functionalized (meth) acrylate copolymer plus un-reacted monomers used to form the acid-functionalized (meth)acrylate copolymer.

The first reaction mixture includes a non-tertiary alkyl acrylates. Suitable non-tertiary alkyl groups have up to 20 carbon atoms, up to 18 carbon atoms, up to 12 carbon atoms, or up to 10 carbon atoms. The non-tertiary alkyl group often has 1 to 20 carbon atoms, 1 to 18 carbon atoms, 2 to 18 carbon atoms, 4 to 18 carbon atoms, 1 to 12 carbon atoms, 4 to 12 carbon atoms, 1 to 10 carbon atoms, or 4 to 10 carbon atoms. The non-tertiary alkyl groups can be linear, branched, or a combination thereof. Example non-tertiary alkyl acrylates include, but are not limited to, methyl acrylate, ethyl acrylate, n-propyl acrylate, isopropyl acrylate, butyl acrylate, isobornyl acrylate, 2-(2-ethoxyethoxy)ethyl acrylate, n-pentyl acrylate, isopentyl acrylate, 2-methylbutyl acrylate, n-hexyl acrylate, 4-methyl-2-pentyl acrylate, 2-ethylhexyl acrylate, 2-methylhexyl acrylate, n-octyl acrylate, isooctyl acrylate, 2-octyl acrylate, isononyl acrylate, isoamyl acrylate, n-decyl acrylate, isodecyl acrylate, 2-propylheptyl acrylate, isotridecyl acrylate, isostearyl acrylate, octadecyl acrylate, 2-octyldecyl acrylate, dodecyl acrylate, lauryl acrylate, and heptadecanyl acrylate.

The amount of the non-tertiary alkyl acrylate is typically in a range of 45 to 99.5 weight percent based on a total weight of monomers in the first reaction mixture. In some embodiments, the amount of the non-tertiary alkyl acrylate is at least 45 weight percent, at least 50 weight percent, at least 55 weight percent, at least 60 weight percent, at least 70 weight percent, at least 80 weight percent, at least 85 weight percent, or at least 90 weight percent of the total weight of monomers in the first reaction mixture. The amount of the non-tertiary alkyl acrylate is often up to 99.5 weight percent, up to 99 weight percent, up to 98 weight percent, up to 95 weight percent, up to 90 weight percent, up to 85 weight percent, up to 80 weight percent, up to 75 weight percent, or up to 70 weight percent of the total weight of monomers in the first reaction mixture.

The first reaction mixture also includes an acid-functionalized ethylenically unsaturated monomer. Each acid-functionalized group can be present as an acidic group or as a salt of the acidic group. Suitable salts include, for example, a cation selected from ammonium ion, an alkyl substituted ammonium ion, or an alkali metal cation. Useful acid-functionalized ethylenically monomers include, but not limited to, ethylenically unsaturated carboxylic acids, ethylenically unsaturated sulfonic acids, and ethylenically unsaturated phosphonic acids. Examples of acid-functionalized ethylenically unsaturated monomers include, but are not limited to, Isobornyl acrylate, methacrylic acid, itaconic acid, crotonic acid, citraconic acid, maleic acid, oleic acid, β-carboxyethyl methacrylate, styrenesulfonic acid, 2-acrylamido-2-methylpropane sulfonic acid, vinyl phosphonic acid, and mixtures thereof. Due to their processability, the acid-functionalized ethylenically unsaturated monomers are commonly selected from the ethylenically unsaturated carboxylic acids such as, for example, (meth)acrylic acid. In many embodiments, this monomer is acrylic acid. When a stronger acid is desired, the acid-functionalized ethylenically unsaturated monomer can be an ethylenically unsaturated sulfonic acid and an ethylenically unsaturated phosphonic acid.

The amount of the acid-functionalized ethylenically unsaturated monomer is typically in a range of 0.5 to 15 weight percent based on a total weight of monomers in the first reaction mixture. In some embodiments, the amount of the acid-functionalized ethylenically unsaturated monomer is at least 0.5 weight percent, at least 1 weight percent, at least 2 weight percent, or at least 5 weight percent. The amount of the acid-functionalized ethylenically unsaturated monomer is up to 15 weight percent, up to 10 weight percent, or up to 5 weight percent.

The first reaction mixture can optionally include a high Tg (meth)acrylate monomer. When referring to this monomer, the term "high Tg" means that the Tg of the corresponding homopolymer formed from the particular monomer is at least 25° C., at least 30° C., at least 35° C., at least 40° C., at least 45° C., or at least 50° C. The Tg of the high Tg (meth)acrylate monomer is typically greater than the Tg for the non-tertiary alkyl acrylates discussed above. The high Tg (meth)acrylate monomer is often a cycloalkyl acrylate, a bicyclic alkyl acrylate, an alkyl methacrylate, or an aryl methacrylate. Suitable cycloalkyl acrylates include often have a cyclic alkyl having 6 to 10 carbon atoms such as, for example, cyclohexyl acrylate and 3,3,5-trimethylcyclohexyl acrylate. Suitable alkyl methacrylates can have alkyl groups that are linear, branched, cyclic, or a combination thereof and that have up to 20 carbon atoms, up to 18 carbon atoms, up to 12 carbon atoms, up to 10 carbon atoms, or up to 8 carbon atoms. Example alkyl methacrylates include, but are not limited to, methyl methacrylate, ethyl methacrylate, n-propyl methacrylate, isopropyl methacrylate, n-butyl methacrylate, isobutyl methacrylate, tert-butyl methacrylate, and octadecyl methacrylate. Suitable aryl methacrylates include, but are not limited to, phenyl methacrylate and benzyl methacrylate.

The high Tg (meth)acrylate monomer can be present in amounts from 0 to 40 weight percent based on the total weight of monomers in the first reaction mixture. Although optional, the high Tg (meth)acrylate monomer is included in many embodiments. If present, the high Tg (meth)acrylate monomer is often present in an amount equal to at least 1 weight percent, at least 5 weight percent, at least 10 weight percent, at least 15 weight percent, or at least 20 weight percent. The high Tg (meth)acrylate monomer can be present in an amount up to 40 weight percent, up to 35 weight percent, up to 30 weight percent, or up to 25 weight percent. If present, the combination of the high Tg (meth)acrylate monomer and the non-tertiary alkyl acrylate is present in an amount up to 99.5 weight percent, up to 99 weight percent, up to 95 weight percent, or up to 90 weight percent based on a total weight of monomers in the first reaction mixture.

In some first reaction mixtures, the monomers include 0.5 to 15 weight percent acid-functionalized ethylenically unsaturated monomer and 85 to 99.5 weight percent of a combination of the non-tertiary alkyl acrylate and the high Tg (meth)acrylate monomer. For example, the monomers include 1 to 15 weight percent acid-functionalized ethylenically unsaturated monomer and 85 to 99 weight percent of the combination of the non-tertiary alkyl acrylate and the high Tg (meth)acrylate monomer, 1 to 10 weight percent acid-functionalized ethylenically unsaturated monomer and 90 to 99 weight percent of the combination of the non-tertiary alkyl acrylate and the high Tg (meth)acrylate monomer, or 1 to 5 weight percent acid-functionalized ethylenically unsaturated monomer and 95 to 99 weight percent of the combination of the non-tertiary alkyl acrylate and the high Tg (meth)acrylate monomer.

The first reaction mixture can further include an optional non-acidic ethylenically unsaturated polar monomer. The polar monomer has a polar group such as a hydroxyl group, a primary amido group, a secondary amido group, a tertiary amido group, an amino group, or an ether group (i.e., a group containing at least one alkylene-oxy-alkylene group of formula —R—O—R— where each R is an alkylene having 1 to 4 carbon atoms). The various amido or amino groups can be in the form of a cation and can have an anionic counter ion. In many embodiments, the anionic counter ion is a halide, acetate, formate, sulfate, phosphate, or the like.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth)acrylate (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with a primary amido group is (meth)acrylamide and with secondary amido group include, but are not limited to, N-alkyl (meth)acrylamides such as N-methyl (meth)acrylamide, N-ethyl (meth)acrylamide, N-isopropyl (meth)acrylamide, N-tert-butyl (meth)acrylamide, N-tert-octyl (meth)acrylamide, or N-octyl (meth)acrylamide. Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth) acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

Exemplary polar monomers with an ether group include, but are not limited to, vinyl ethers such as vinyl methyl ether; alkoxylated alkyl (meth)acrylates such as 2-(2-ethoxyethoxy) ethyl (meth)acrylate, 2-ethoxyethyl(meth)acrylate, 2-methoxyethoxy ethyl (meth)acrylate, and 2-methoxyethyl (meth)acrylate; and poly(alkylene oxide) (meth)acrylates, which are often referred to as polyalkylene glycol (meth)acrylates, and that include polyethylene glycol (meth)acrylate and polypropylene glycol (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

The non-acidic ethylenically unsaturated polar monomer can be present in an amount from 0 to 10 weight percent based on a total weight of monomers in the first reaction mixture. If present, the non-acidic ethylenically unsaturated polar monomer is often used in an amount of at least 0.5 weight percent, at least 1 weight percent, at least 2 weight percent, at least 3 weight percent, or at least 5 weight percent. The non-acidic ethylenically unsaturated polar monomer can be present in an amount up to 10 weight percent, up to 8 weight percent, up to 6 weight percent, or up to 5 weight percent.

The first reaction mixture can still further include other optional vinyl monomers. Suitable optional vinyl monomers include vinyl esters such as vinyl acetate and vinyl propionate, styrene, substituted styrene such as alpha-methyl styrene, vinyl chlorides, olefinic monomers such as ethylene, propylene, and butylenes, and the like. These other vinyl monomers do not include any of the previously described non-tertiary alkyl acrylates, high Tg (meth)acrylate monomers, polar monomers, or acid-functionalized monomers.

The optional other vinyl monomers can be present in an amount from 0 to 5 weight percent based on a total weight of monomers in the first reaction mixture. If present, the other vinyl monomer is often used in an amount of at least 0.5 weight percent, at least 1 weight percent, or at least 2 weight percent. The amount can be up to 5 weight percent, up to 4 weight percent, or up to 3 weight percent.

The first reaction mixture can yet further include an optional multi-functional (meth)acrylate monomer. Because the first reaction mixture is typically used to form a first syrup polymer that includes a partially polymerized acid-functional (meth)acrylate copolymer, the optional multi-functional (meth)acrylate monomer is not used or is used in an amount that does not result in the formation of a second phase within the first syrup.

Suitable optional multi-functional (meth)acrylate monomers, if present, often have two acryloyl groups (the multi-functional (meth)acrylate monomer is a diacrylate). Exemplary crosslinkers with two acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, and neopentylglycol hydroxypivalate diacrylate modified caprolactone.

The amount of the optional multi-functional (meth)acrylate monomer is often in a range of 0 to 5 weight percent based on a total weight of monomer in the first reaction mixture. If present, the amount is often at least 0.01 weight percent, at least 0.02 weight percent, at least 0.05 weight percent, or at least 0.1 weight percent. The amount can be up to 2 weight percent, up to 1 weight percent, or up to 0.5 weight percent. In many embodiments, the optional multi-functional (meth)acrylate monomer is not included in the first reaction mixture.

Some exemplary first reaction mixtures include (a) 45 to 99.5 weight percent of a non-tertiary alkylacrylate, (b) 0.5 to 15 weight percent of an acid-functionalized ethylenically unsaturated monomer, (c) 0 to 40 weight percent of an optional high Tg (meth)acrylate monomer whose Tg is higher than the Tg value of the non-tertiary alkyl acrylate monomer, (d) 0 to 10 weight percent of an optional non-acidic ethylenically unsaturated polar monomer, (e) 0 to 5 weight percent of an optional other vinyl monomer, and (f) 0 to 5 weight percent of an optional multi-functional (meth) acrylate monomer. No other monomers are present. The weight percents are based on the total weight of monomers in the first reaction mixture.

Other exemplary first reaction mixtures include (a) 70 to 98 weight percent of a non-tertiary alkyl acrylate, (b) 1 to 10 weight percent of an acid-functionalized ethylenically unsaturated monomer, (c) 1 to 30 weight percent of an optional high Tg (meth)acrylate monomer whose Tg is higher than the Tg value of the non-tertiary alkyl acrylate monomer, (d) 0 to 10 weight percent of an optional non-acidic ethylenically unsaturated polar monomer, (e) 0 to 5 weight percent of an optional other vinyl monomer, and (f) 0 to 1 weight percent of an optional multi-functional (meth)acrylate monomer. No other monomers are present. The weight percents are based on the total weight of monomers in the first reaction mixture.

Still other exemplary first reaction mixtures include (a) 65 to 99 weight percent of a non-tertiary alkyl acrylate, (b) 1 to 15 weight percent of an acid-functionalized ethylenically unsaturated monomer, (c) 1 to 30 weight percent of an optional high Tg (meth)acrylate monomer whose Tg is higher than the Tg value of the non-tertiary alkyl acrylate monomer. No other monomers are present. The weight percents are based on the total weight of monomers in the first reaction mixture.

An ultraviolet photoinitiator is typically added to the first reaction mixture. This photoinitiator is added to form the first syrup polymer from the first reaction mixture. That is, first syrup polymer is prepared by photo-initiated free radical polymerization of the first reaction mixture. The advantages of photo-initiated free radical polymerization include the following: (1) the reaction mixture does not need to be heated and (2) photo-initiation stops when the activation light source is turned off. The degree of polymerization (i.e., the percent conversion of the monomers to polymeric material) easily can be controlled through the use of a photoinitiator. For the first reaction mixture used to form the first syrup polymer, the polymerization reaction is typically stopped when the desired viscosity is attained. The desired viscosity corresponds to a viscosity suitable for coating and typically corresponds to a percent conversion up to about 30 weight percent based on the weight of monomers in the first reaction mixture. When the desired percent conversion and viscosity are reached, removing the light source and introducing air (oxygen) into the partially polymerized product quenches the radicals and terminates polymerization.

If desired, an organic solvent (i.e., a non-monomer organic solvent) can be added to the first reaction mixture. The organic solvent may be added for the purpose of preparing a partially polymerized acid-functionalized (meth)acrylate copolymer with a higher molecular weight and with a higher percent conversion of the monomers in the first reaction mixture. That is, the organic solvent lowers the viscosity of the reaction mixture. If an organic solvent is used, it can be removed, for example, by vacuum distillation, after the syrup polymer has formed. Although it is an acceptable process, it is not the most preferable one, because an additional organic solvent removal step is needed, another material (non-monomer organic solvent) is needed, and dissolving the resulting partially polymerized material with the higher molecular weight and higher percent conversion of monomers may require a considerably longer time.

The first reaction mixture often does not contain an organic solvent or water. Any organic solvent or water that is present is present as an impurity in one of the other components added to the first reaction mixture. That is, the amount of organic solvent and/or water is no greater than 5 weight percent, no greater than 3 weight percent, no greater than 2 weight percent, no greater than 1 weight percent, no greater than 0.5 weight percent, or no greater than 0.1 weight percent based on a total weight of the first reaction mixture.

In other embodiments, however, an organic solvent can be present. Suitable organic solvents are those that are inert (e.g., the organic solvents do not undergo a polymerization reaction or react with any other component in the reaction mixture). Suitable solvents are selected that are compatible with the monomers included in the first reaction mixture and that allow the formation of a single phase syrup polymer. That is, the solvents are selected to have good compatibility with the monomers and with the partially polymerized acid-functionalized (meth)acrylate copolymer. Example solvents include ethyl acetate, toluene, and tetrahydrofuran.

Ultraviolet photoinitiators include, for example, benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenyl-1-acetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenylphosphineoxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA).

The amount of ultraviolet photoinitiator added to the first reaction is determined based on the desired degree of conversion of the monomers to the partially polymerized acid-functionalized (meth)acrylate copolymer in the first syrup polymer. The concentration is typically 0.0001 to 3 weight percent based on a total weight of monomers in the first reaction mixture. The amount is often at least 0.0001 weight percent, at least 0.0005 weight percent, at least 0.001 weight percent, at least 0.005 weight percent, at least 0.01 weight percent, at least 0.05 weight percent, at least 0.1 weight percent, or at least 0.5 weight percent. The amount is often up to 3 weight percent, up to 2 weight percent, up to 1 weight percent, up to 0.5 weight percent, or up to 0.1 weight percent.

The percent conversion of the first reaction mixture during irradiation with a UV source to form the first syrup polymer can be monitored by measuring the refractive index. The percent conversion is typically no greater than 30 weight percent to provide a syrup polymer with a useful viscosity. In many embodiments, the percent conversion to the first syrup polymer is no greater than 25 weight percent, no greater than 20 weight percent, or no greater than 15 weight percent. The percent conversion is typically at least 1 weight percent, at least 2 weight percent, at least 5 weight percent, or at least 10 weight percent. In some embodiments, the percent conversion is in a range of 1 to 30 weight percent, 2 to 20 weight percent, in a range of 5 to 20 weight percent, in a range of 5 to 15 weight percent, in a range of 7 to 12 weight percent.

Stated differently, the first syrup polymer contains up to 30 weight percent of the partially polymerized acid-functionalized (meth)acrylate copolymer (up to 30 weight percent of the monomers in the first reaction mixture have undergone polymerization) and at least 70 weight percent monomer (unreacted monomers that have not undergone polymerization). The weight percent values are based on the total weight of monomers in the first reaction mixture. In some embodiments, the first syrup contains 1 to 30 weight percent partially polymerized (meth)acrylate copolymer and 70 to 99 weight percent monomer, 2 to 20 weight percent partially polymerized (meth)acrylate copolymer and 80 to 98 weight percent monomer, 5 to 20 weight percent partially polymerized (meth)acrylate copolymer and 80 to 95 weight percent monomer, or 5 to 15 weight percent partially polymerized (meth)acrylate copolymer and 85 to 95 weight percent monomer. The partially polymerized (meth)acrylate copolymer is dissolved in the unreacted monomer of the first reaction mixture.

The first reaction mixture is typically polymerized to provide a first syrup that has a viscosity of 500 to 10,000 centipoises (cPs) at 22° C. The molecular weight of the partially polymerized acid-functionalized (meth)acrylate copolymer is typically greater than 500,000 grams/mole (Daltons, Da). For example, the weight average molecular weight is often at least 750,000 Da, at least 1,000,000 Da, at least 1,500,000 Da, at least 2,000,000 Da, or at least 3,000,000 Da. The weight average molecular weight can be up to 5,000,000 Da, up to 6,000,000 Da, up to 8,000,000 Da, or up to 10,000,000 Da.

In some embodiments, all of the monomers used to prepare the acid-functionalized (meth)acrylate copolymer are included in the original first reaction mixture that is used to form the first syrup polymer. In other embodiments, some of the monomers such as, for example, the optional high Tg (meth)acrylate monomer can be added after formation of the first syrup polymer. That is, some of the monomers can be present in the curable adhesive composition that is used to form the pressure-sensitive adhesive but not in the original first reaction mixture used to form the first syrup.

Preparation of Low Glass Transition Temperature (Meth) Acrylate Polymer Tackifier The pressure-sensitive adhesives include an additional polymeric material in addition to the acid-functionalized (meth)acrylate copolymer described above. More specifically, the pressure-sensitive adhesives include a low glass transition temperature (meth)acrylate polymer tackifier that is a polymeric material having a Tg no greater than 0° C.

Any suitable method can be used to prepare the low glass transition temperature (meth)acrylate polymer tackifier. In many embodiments, the low glass transition temperature (meth)acrylate polymer tackifier is prepared from a second reaction mixture that includes the following monomers: (a) a non-tertiary alkyl acrylate, (b) an acid-functionalized ethylenically unsaturated monomer, (c) an optional high Tg (meth)acrylate monomer whose Tg is higher than the Tg value of the non-tertiary alkyl acrylate monomer, (d) an optional non-acidic ethylenically unsaturated polar monomer, (e) other optional vinyl monomers, and (f) an optional multi-functional (meth)acrylate monomer. An initiator (e.g., polymerization initiator) is typically added to the second reaction mixture. This initiator is usually a photoinitiator such as an ultraviolet photoinitiator.

Suitable non-tertiary alkyl acrylate monomers for use in the second reaction mixture are the same as those described above for use in the first reaction mixture. The amount of the non-tertiary alkyl acrylate is typically present in a range of 30 to 99.5 weight percent based on a total weight of monomers in the second reaction mixture. In some embodiments, the amount of the non-tertiary alkyl acrylate is at least 30 weight percent, at least 40 weight percent, at least 50 weight percent, at least 60 weight percent, at least 70 weight percent, at least 80 weight percent, at least 85 weight percent, or at least 90 weight percent of the total weight of monomers in the second reaction mixture. The amount of the non-tertiary acrylate is often up to 99.5 weight percent, up to 99 weight percent, up to 98 weight percent, up to 95 weight percent, up to 90 weight percent, up to 85 weight percent, up to 80 weight percent, up to 75 weight percent, or up to 70 weight percent.

Suitable acid-functionalized ethylenically unsaturated monomers for use in the second reaction mixture are the same as those described above for use in the first reaction mixture. This monomer is often (meth)acrylic acid. In many embodiments, this monomer is acrylic acid. The amount of the acid-functionalized ethylenically unsaturated monomer is typically in a range of 0.5 to 15 weight percent based on a total weight of monomers in the second reaction mixture. In some embodiments, the amount of the acid-functionalized ethylenically unsaturated monomer is at least 0.5 weight percent, at least 1 weight percent, at least 2 weight percent, or at least 5 weight percent. The amount of the acid-functionalized ethylenically unsaturated monomer is up to 15 weight percent, up to 10 weight percent, or up to 5 weight percent.

Suitable optional high Tg (meth)acrylate monomers for use in the second reaction mixture are the same as those described above for use in the first reaction mixture. The high Tg (meth)acrylate monomer can be present in amounts from 0 to 60 weight percent based on the total weight of monomers in the second reaction mixture. Although optional, the high Tg (meth)acrylate monomer is included in many embodiments of the second reaction mixture. If present, the high Tg (meth)acrylate monomer is often present in an amount equal to at least 1 weight percent, at least 5 weight percent, at least 10 weight percent, at least 15 weight percent, or at least 20 weight percent. The high Tg (meth) acrylate monomer can be present in an amount up to 60 weight percent, up to 50 weight percent, up to 40 weight percent, up to 35 weight percent, up to 30 weight percent, or up to 25 weight percent.

Suitable optional non-acidic ethylenically unsaturated polar monomers for use in the second reaction mixture are the same as those described above for use in the first reaction mixture. The non-acidic ethylenically unsaturated polar monomer can be present in an amount from 0 to 40 weight percent based on a total weight of monomers in the second reaction mixture. If present, the non-acidic ethylenically unsaturated polar monomer is often used in an amount of at least 1 weight percent, at least 2 weight percent, at least 5 weight percent, or at least 10 weight percent. The non-acidic ethylenically unsaturated polar monomer can be present in an amount up to 40 weight percent, up to 35 weight percent, up to 30 weight percent, up to 25 weight percent, or up to 20 weight percent.

Suitable other optional vinyl monomers for use in the second reaction mixture are the same as those described above for the first reaction mixture. The other optional vinyl monomers can be present in an amount from 0 to 40 weight percent based on a total weight of monomers in the second reaction mixture. If present, the other vinyl monomer is often used in an amount of at least 1 weight percent, at least 2 weight percent, at least 5 weight percent, or at least 10 weight percent. The other vinyl monomers can be present in an amount up to 40 weight percent, up to 35 weight percent, up to 30 weight percent, up to 25 weight percent, or up to 20 weight percent.

Suitable optional multi-functional (meth)acrylate monomers for use in the second reaction mixture are the same as those described above for use in the first reaction mixture. The amount of the optional multi-functional (meth)acrylate monomer is often in a range of 0 to 5 weight percent based on a total weight of monomer in the second reaction mixture. If present, the amount is often at least 0.01 weight percent, at least 0.02 weight percent, at least 0.05 weight percent, at least 0.1 weight percent, at least 0.2 weight percent, or at least 0.5 weight percent. The amount can be up to 5 weight percent, up to 3 weight percent, up to 2 weight percent, or up to 1 weight percent. In many embodiments, the optional multi-functional (meth)acrylate monomer is not included in the second reaction mixture.

Some exemplary second reaction mixtures include (a) 30 to 99.5 weight percent of a non-tertiary alkyl acrylate, (b) 0.5 to 15 weight percent of an acid-functionalized ethylenically unsaturated monomer, (c) 0 to 60 weight percent of an optional high Tg (meth)acrylate monomer whose Tg is higher than the Tg value of the non-tertiary alkyl acrylate monomer, (d) 0 to 40 weight percent of an optional non-acidic ethylenically unsaturated polar monomer, (e) 0 to 40 weight percent of optional other vinyl monomers, and (f) 0 to 5 weight percent of an optional multi-functional (meth)acrylate monomer. No other monomers are present. The weight percents are based on the total weight of monomers in the second reaction mixture.

Other exemplary second reaction mixtures include (a) 35 to 90 weight percent of a non-tertiary alkyl acrylate, (b) 0.5 to 15 weight percent of an acid-functionalized ethylenically unsaturated monomer, (c) 10 to 60 weight percent of an optional high Tg (meth)acrylate monomer whose Tg is higher than the Tg value of the non-tertiary alkyl acrylate monomer, (d) 0 to 30 weight percent of an optional non-acidic ethylenically unsaturated polar monomer, (e) 0 to 30 weight percent of optional other vinyl monomers, and (f) 0 to 2 weight percent of an optional multi-functional (meth)acrylate monomer. No other monomers are present. The weight percents are based on the total weight of monomers in the second reaction mixture.

Still other exemplary second reaction mixtures include (a) 40 to 80 weight percent of a non-tertiary alkyl acrylate, (b) 0.5 to 15 weight percent of an acid-functionalized ethylenically unsaturated monomer, (c) 0 to 30 weight percent of an optional high Tg (meth)acrylate monomer whose Tg is higher than the Tg value of the non-tertiary alkyl acrylate monomer, (d) 10 to 40 weight percent of an optional non-acidic ethylenically unsaturated polar monomer, (e) 0 to 40 weight percent of optional other vinyl monomers, and (f) 0 to 1 weight percent of an optional multi-functional (meth)acrylate monomer. No other monomers are present. The weight percents are based on the total weight of monomers in the second reaction mixture.

The second reaction mixture typically includes an initiator such as an ultraviolet photoinitiator. Suitable ultraviolet photoinitiators are the same as those described above for the first reaction mixture. The amount of the photoinitiator is often in a range of 0.005 to 5 weight percent based on a total weight of monomers in the second reaction mixture. The amount of the photoinitiator is often at least 0.005 weight percent, at least 0.01 weight percent, at least 0.05 weight percent, at least 0.1 weight percent, or at least 0.5 weight percent. The amount of the photoinitiator can be up to 5 weight percent, up to 3 weight percent, up to 2 weight percent, or up to 1 weight percent.

To obtain a low glass transition temperature (meth)acrylate oligomer tackifier having the desired weight average molecular weight range, an optional chain transfer agent may be used to adjust the molecular weight. Examples of useful chain transfer agent include, but not limited to, the chain transfer agents such as carbon tetrabromide, alcohols, thiols such as thioglyolates, and mixtures thereof. In many embodiments, the preferred chain transfer agent is iso-octyl thioglycolate (IOTG), carbon tetrabromide, or tert-dodecyl-mercaptan (TDDM). The amount of the optional chain transfer agent is often in a range of 0 to 5 weight percent based on the total weight of monomers in the second reaction mixture. If present, the chain transfer agent is often used in an amount of at least 0.01 weight percent, at least 0.05 weight percent, at least 0.1 weight percent, or at least 0.5 weight percent. The amount can be up to 5 weight percent, up to 3 weight percent, up to 2 weight percent, or up to 1 weight percent.

The low glass transition temperature (meth)acrylate polymer tackifier is formed by exposing the second reaction mixture to ultraviolet radiation. Any suitable method of polymerizing the second reaction mixture with ultraviolet radiation can be used. In a first method, the second reaction mixture is exposed to ultraviolet radiation and a second syrup polymer is prepared. The second syrup polymer contains a partially but not completely polymerized (meth)acrylate tackifier plus remaining un-reacted monomers. For example, the second syrup polymer can have a percent conversion of at least 70 weight percent, at least 75 weight percent, at least 80 weight percent, or at least 85 weight percent. The percent conversion is typically less than 95 weight percent, or less than 90 weight percent. The percent conversion is based on the total weight of monomers in the second reaction mixture. This second syrup is added to the curable adhesive composition.

In a second method, the second syrup polymer is polymerized to a percent conversion of monomers of at least 30 weight percent based on the total weight of monomers in the second reaction mixture. That is, the second reaction mixture is polymerized until the resulting partially polymerized second syrup polymer has a suitable coating viscosity. The percent conversion can up at least 40 weight percent, at least 50 weight percent, at least 60 weight percent, at least 70 weight percent, or at least 80 weight percent. This second syrup polymer is then coated as a thin layer and exposed to radiation (e.g., UV light) to obtain higher percent conversions. For example, the percent conversion using the second method can be at least 85 weight percent, at least 90 weight percent, at least 95 weight percent, at least 98 weight percent, at least 99 weight percent, or at least 99.5 percent. The percent conversion is often preferably at least 95 weight percent, at least 98 weight percent, or at least 99 weight percent. This polymeric material with a high percent conversion is added to the curable adhesive composition.

The weight average molecular weight of the low glass transition temperature (meth)acrylate polymer tackifier is greater than 15,000 grams/mole (Daltons) but no greater than 120,000 grams/mole (Daltons). The weight average molecular weight can be at least 15,000 Da, at least 20,000 Da, at least 30,000 Da, at least 40,000 Da, or at least 50,000 Da. The weight average molecular weight can be no greater than 120,000 Da, up to 110,000 Da, up to 90,000 Da, up to 8,000 Da, or up to 60,000 Da.

The low glass transition temperature (meth)acrylate polymer tackifier has a glass transition temperature no greater than 0° C. For example, the Tg can be no greater than 0° C., no greater than −10° C., or no greater than −20° C. The Tg is often greater than −100° C., greater than −80° C., or greater than −60° C., greater than −40° C., or greater than −30° C. In some embodiments, the Tg is in a range of −100° C. to 0° C., in a range of −80° C. to 0° C., in a range of −40° C. to 0° C., or in a range of −20° C. to 0° C.

Preparation of High Glass Transition Temperature (Meth) Acrylate Polymer Tackifier The pressure-sensitive adhesives include an additional polymeric material in addition to the acid-functionalized (meth)acrylate copolymer and the low glass transition temperature (meth)acrylate polymer tackifier described above. More specifically, the pressure-sensitive adhesives include a high glass transition temperature (meth)acrylate polymer tackifier that is a polymeric material having a Tg of at least 5° C.

Any suitable method can be used to prepare the high glass transition temperature (meth)acrylate polymer tackifier. In many embodiments, the high glass transition temperature (meth)acrylate polymer tackifier is prepared from a third reaction mixture that includes the following monomers: (a) a non-tertiary alkyl acrylate, (b) an acid-functionalized ethylenically unsaturated monomer, (c) an optional high Tg (meth)acrylate monomer whose Tg is higher than the Tg value of the non-tertiary alkyl acrylate monomer, (d) an optional non-acidic ethylenically unsaturated polar monomer, (e) other optional vinyl monomers, and (f) an optional multi-functional (meth)acrylate monomer. An initiator (e.g., polymerization initiator) is typically added to the third reaction mixture. This initiator is usually a photoinitiator such as an ultraviolet photoinitiator.

Suitable non-tertiary alkyl acrylate monomers for use in the third reaction mixture are the same as those described above for use in the first reaction mixture. The amount of the non-tertiary alkyl acrylate is typically present in a range of 30 to 99.5 weight percent based on a total weight of monomers in the third reaction mixture. In some embodiments, the amount of the non-tertiary alkyl acrylate is at least 30 weight percent, at least 40 weight percent, at least 50 weight percent, at least 60 weight percent, at least 70 weight percent, at least 80 weight percent, at least 85 weight percent, or at least 90 weight percent of the total weight of monomers in the third reaction mixture. The amount of the non-tertiary acrylate is often up to 99.5 weight percent, up to 99 weight percent, up to 98 weight percent, up to 95 weight percent, up to 90 weight percent, up to 85 weight percent, up to 80 weight percent, up to 75 weight percent, or up to 70 weight percent.

Suitable acid-functionalized ethylenically unsaturated monomers for use in the third reaction mixture are the same as those described above for use in the first reaction mixture. This monomer is often (meth)acrylic acid. In many embodiments, this monomer is acrylic acid. The amount of the acid-functionalized ethylenically unsaturated monomer is typically in a range of 0.5 to 15 weight percent based on a total weight of monomers in the third reaction mixture. In some embodiments, the amount of the acid-functionalized ethylenically unsaturated monomer is at least 0.5 weight percent, at least 1 weight percent, at least 2 weight percent, or at least 5 weight percent. The amount of the acid-functionalized ethylenically unsaturated monomer is up to 15 weight percent, up to 10 weight percent, or up to 5 weight percent.

Suitable optional high Tg (meth)acrylate monomers for use in the third reaction mixture are the same as those described above for use in the first reaction mixture. The high Tg (meth)acrylate monomer can be present in amounts from 0 to 60 weight percent based on the total weight of monomers in the third reaction mixture. Although optional, the high Tg (meth)acrylate monomer is included in many embodiments of the third reaction mixture. If present, the high Tg (meth)acrylate monomer is often present in an amount equal to at least 1 weight percent, at least 5 weight percent, at least 10 weight percent, at least 15 weight percent, or at least 20 weight percent. The high Tg (meth) acrylate monomer can be present in an amount up to 60 weight percent, up to 50 weight percent, up to 40 weight percent, up to 35 weight percent, up to 30 weight percent, or up to 25 weight percent.

Suitable optional non-acidic ethylenically unsaturated polar monomers for use in the third reaction mixture are the same as those described above for use in the first reaction mixture. The non-acidic ethylenically unsaturated polar monomer can be present in an amount from 0 to 40 weight percent based on a total weight of monomers in the third reaction mixture. If present, the non-acidic ethylenically unsaturated polar monomer is often used in an amount of at least 1 weight percent, at least 2 weight percent, at least 5 weight percent, or at least 10 weight percent. The non-acidic ethylenically unsaturated polar monomer can be present in an amount up to 40 weight percent, up to 35 weight percent, up to 30 weight percent, up to 25 weight percent, or up to 20 weight percent.

Suitable other optional vinyl monomers for use in the third reaction mixture are the same as those described above for the first reaction mixture. The other optional vinyl monomers can be present in an amount from 0 to 40 weight percent based on a total weight of monomers in the third reaction mixture. If present, the other vinyl monomer is often used in an amount of at least 1 weight percent, at least 2 weight percent, at least 5 weight percent, or at least 10 weight percent. The other vinyl monomers can be present in an amount up to 40 weight percent, up to 35 weight percent, up to 30 weight percent, up to 25 weight percent, or up to 20 weight percent.

Suitable optional multi-functional (meth)acrylate monomers for use in the third reaction mixture are the same as those described above for use in the first reaction mixture. The amount of the optional multi-functional (meth)acrylate monomer is often in a range of 0 to 5 weight percent based on a total weight of monomer in the first reaction mixture. If present, the amount is often at least 0.01 weight percent, at least 0.02 weight percent, at least 0.05 weight percent, at least 0.1 weight percent, at least 0.2 weight percent, or at least 0.5 weight percent. The amount can be up to 5 weight percent, up to 3 weight percent, up to 2 weight percent, or up to 1 weight percent. In many embodiments, the optional multi-functional (meth)acrylate monomer is not included in the third reaction mixture.

Some exemplary third reaction mixtures include (a) 30 to 99.5 weight percent of a non-tertiary alkyl acrylate, (b) 0.5 to 15 weight percent of an acid-functionalized ethylenically unsaturated monomer, (c) 0 to 60 weight percent of an optional high Tg (meth)acrylate monomer whose Tg is higher than the Tg value of the non-tertiary alkyl acrylate monomer, (d) 0 to 40 weight percent of an optional non-acidic ethylenically unsaturated polar monomer, (e) 0 to 40 weight percent of optional other vinyl monomers, and (f) 0 to 5 weight percent of an optional multi-functional (meth) acrylate monomer. No other monomers are present. The weight percents are based on the total weight of monomers in the third reaction mixture.

Other exemplary third reaction mixtures include (a) 35 to 90 weight percent of a non-tertiary alkyl acrylate, (b) 0.5 to 15 weight percent of an acid-functionalized ethylenically unsaturated monomer, (c) 10 to 60 weight percent of an optional high Tg (meth)acrylate monomer whose Tg is higher than the Tg value of the non-tertiary alkyl acrylate monomer, (d) 0 to 30 weight percent of an optional non-acidic ethylenically unsaturated polar monomer, (e) 0 to 30 weight percent of optional other vinyl monomers, and (f) 0 to 2 weight percent of an optional multi-functional (meth) acrylate monomer. No other monomers are present. The weight percents are based on the total weight of monomers in the reaction mixture.

Still other exemplary third reaction mixtures include (a) 40 to 80 weight percent of a non-tertiary alkyl acrylate, (b) 0.5 to 15 weight percent of an acid-functionalized ethylenically unsaturated monomer, (c) 0 to 30 weight percent of an optional high Tg (meth)acrylate monomer whose Tg is higher than the Tg value of the non-tertiary alkyl acrylate monomer, (d) 10 to 40 weight percent of an optional non-acidic ethylenically unsaturated polar monomer, (e) 0 to 40 weight percent of optional other vinyl monomers, and (f) 0 to 1 weight percent of an optional multi-functional (meth) acrylate monomer. No other monomers are present. The weight percents are based on the total weight of monomers in the third reaction mixture.

The third reaction mixture typically includes an initiator such as an ultraviolet photoinitiator. Suitable ultraviolet photoinitiators are the same as those described above for the first reaction mixture. The amount of the photoinitiator is often in a range of 0.005 to 5 weight percent based on a total weight of monomers in the third reaction mixture. The amount of the photoinitiator is often at least 0.005 weight percent, at least 0.01 weight percent, at least 0.05 weight percent, at least 0.1 weight percent, or at least 0.5 weight percent. The amount of the photoinitiator can be up to 5 weight percent, up to 3 weight percent, up to 2 weight percent, or up to 1 weight percent.

To obtain a high glass transition temperature (meth) acrylate oligomer tackifier having the desired weight average molecular weight range, an optional chain transfer agent may be used to adjust the molecular weight. Examples of useful chain transfer agent include, but not limited to, the chain transfer agents such as carbon tetrabromide, alcohols, thiols such as thioglyolates, and mixtures thereof. In many embodiments, the preferred chain transfer agent is iso-octyl thioglycolate (IOTG), carbon tetrabromide, or tert-dodecyl-mercaptan (TDDM). The amount of the optional chain transfer agent is often in a range of 0 to 5 weight percent based on the total weight of monomers in the third reaction mixture. If present, the chain transfer agent is often used in an amount of at least 0.01 weight percent, at least 0.05 weight percent, at least 0.1 weight percent, or at least 0.5 weight percent. The amount can be up to 5 weight percent, up to 3 weight percent, up to 2 weight percent, or up to 1 weight percent.

The high glass transition temperature (meth)acrylate polymer tackifier is formed by exposing the third reaction mixture to ultraviolet radiation. Any suitable method of polymerizing the third reaction mixture with ultraviolet radiation can be used. In one kind of method, the third reaction mixture is exposed to ultraviolet radiation and a third syrup polymer is prepared. The third syrup polymer contains a partially but not completely polymerized (meth) acrylate tackifier plus remaining un-reacted monomers. The third syrup polymer is polymerized to a percent conversion of monomers of at least 30 weight percent based on the total weight of monomers in the third reaction mixture. That is, the third reaction mixture is polymerized until the resulting partially polymerized third syrup polymer has a suitable coating viscosity. The percent conversion can up at least 40 weight percent, at least 50 weight percent, at least 60 weight percent, at least 70 weight percent, or at least 80 weight percent. This third syrup polymer is then coated as a thin layer and exposed to radiation (e.g., UV light) to obtain higher percent conversions. For example, the percent conversion using the method can be at least 85 weight percent, at least 90 weight percent, at least 95 weight percent, at least 98 weight percent, at least 99 weight percent, or at least 99.5 percent. The percent conversion is often preferably at least 95 weight percent, at least 98 weight percent, or at least 99 weight percent. This polymeric material with a high percent conversion is added to the curable adhesive composition.

The weight average molecular weight of the high glass transition temperature (meth)acrylate polymer tackifier is greater than 10,000 grams/mole (Daltons) but no greater than 150,000 grams/mole (Daltons). The weight average molecular weight can be at least 10,000 Da, at least 20,000 Da, at least 30,000 Da, at least 40,000 Da, at least 50,000 Da, or at least 75,000 Da. The weight average molecular weight can be no greater than 150,000 Da, up to 125,000 Da, up to 100,000 Da, or up to 70,000 Da.

The high glass transition temperature (meth)acrylate polymer tackifier has a glass transition temperature at least 5° C. For example, the Tg can be at least 5° C., be at least 10° C., or be at least 20° C. In some embodiments, the Tg is in a range of 100° C. to 5° C., in a range of 80° C. to 10° C., in a range of 60° C. to 10° C., or in a range of 40° C. to 10° C.

Curable Adhesive Compositions

A curable adhesive composition is prepared that includes (a) the first syrup polymer as described above, (b) the high glass transition temperature (meth)acrylate polymer tackifier as described above, (c) the low glass transition temperature (meth)acrylate polymer tackifier as described above, and (d) an ultraviolet photoinitiator. Stated differently, the curable adhesive composition includes the partially polymerized acid-functionalized (meth)acrylate copolymer from the first syrup polymer, un-reacted monomers from the first syrup polymer, the high glass transition temperature (meth)acrylate polymer tackifier, the low glass transition temperature (meth)acrylate polymer tackifier, and an ultraviolet photoinitiator.

More specifically, the curable adhesive composition includes (a) a first syrup polymer formed from a first reaction mixture, (b) a high glass transition temperature (meth)acrylate polymer tackifier having a glass transition temperature at least 5° C., (c) a low glass transition temperature (meth)acrylate polymer tackifier having a glass transition temperature no greater than 0° C., and (d) an ultraviolet photoinitiator. The first reaction mixture used to form the first syrup polymer contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture.

In some embodiments, additional monomers not included in the first syrup polymer are added to the curable composition. For example, the optional high Tg (meth)acrylate monomer can be added after formation of the first syrup polymer. The high Tg (meth)acrylate monomers are the same as those described above.

The high glass transition temperature (meth)acrylate polymer tackifier used in the curable adhesive composition can be added as a completely polymerized material (e.g., a percent conversion of at least 95 weight percent, at least 98 weight percent, at least 99 weight percent, or at least 99.5 weight percent). The high glass transition temperature (meth)acrylate polymer tackifier is soluble within the first syrup. Stated differently, the curable adhesive composition is typically a single phase.

The amount of the high glass transition temperature (meth)acrylate polymer tackifier added to the curable adhesive composition is typically no greater than 29 weight percent based on the total weight of the first syrup polymer, which excludes any non-monomer organic solvent. That is, there are no more than 29 parts of the high glass transition temperature (meth)acrylate polymer tackifier added for every 100 parts of the first syrup polymer (e.g., partially polymerized acid-functionalized (meth)acrylate copolymer and un-reacted monomers). This weight of the high glass transition temperature (meth)acrylate polymer tackifier can be a polymeric material with a high percent conversion as described above. In many embodiments, the amount of the high glass transition temperature (meth)acrylate polymer tackifier is no greater than 29 weight percent, no greater than 20 weight percent, no greater than 15 weight percent, or no greater than 10 weight percent based on the total weight of the first syrup polymer. The amount of the high glass transition temperature (meth)acrylate polymer tackifier is often at least 2 weight percent, at least 5 weight percent, or at least 8 weight percent based on a total weight of the first syrup polymer.

The low glass transition temperature (meth)acrylate polymer tackifier used in the curable adhesive composition can be added as a second syrup polymer with a percent conversion of at least 70 weight percent or as a completely polymerized material (e.g., a percent conversion of at least 95 weight percent, or at least 98 weight percent). The low glass transition temperature (meth)acrylate polymer tackifier is soluble within the first syrup. Stated differently, the curable adhesive composition is typically a single phase.

The amount of the low glass transition temperature (meth)acrylate polymer tackifier added to the curable adhesive composition is typically no greater than 15 weight percent based on the total weight of the first syrup polymer, which excludes any non-monomer organic solvent. That is, there are no more than 15 parts of the low glass transition temperature (meth)acrylate polymer tackifier added for every 100 parts of the first syrup polymer (e.g., partially polymerized acid-functionalized (meth)acrylate copolymer and un-reacted monomers). This weight of the low glass transition temperature (meth)acrylate polymer tackifier can be either a second syrup polymer as described above or as a polymeric material with a high percent conversion as described above. In many embodiments, the amount of the low glass transition temperature (meth)acrylate polymer tackifier is no greater than 15 weight percent, no greater than 10 weight percent, or no greater than 8 weight percent based on the total weight of the first syrup polymer. The amount of the low glass transition temperature (meth)acrylate polymer tackifier is often at least 2 weight percent, at least 4 weight percent, or at least 6 weight percent based on a total weight of the first syrup polymer.

An ultraviolet photoinitiator is added to the curable adhesive composition. This component generates radicals needed for the polymerization of the un-reacted monomers in the first syrup polymer and any other optional monomers and/or crosslinkers included in the curable adhesive composition. Suitable ultraviolet photoinitiators include those described above for use in the first syrup polymer. The amount of the photoinitiator in the curable adhesive composition is often 0.001 to 3 weight percent based on a total weight of the first syrup polymer. The amount is often at least 0.001 weight percent, at least 0.005 weight percent, at least 0.01 weight percent, at least 0.05 weight percent, or at least 0.1 weight percent. The amount is often up to 3 weight percent, up to 2 weight percent, up to 1 weight percent, or up to 0.5 weight percent.

Other optional components can be included in the curable adhesive composition. For example, the curable adhesive composition can include an optional crosslinker. The addition of the optional crosslinker can, for example, improve the cohesion force of the resulting cured adhesive composition, enhance weather resistance of the cured adhesive composition, increase the heat resistance of the cured adhesive composition, increase the oil and/or organic solvent resistance of the cured adhesive composition, or a combination thereof.

Any suitable crosslinker can be used in the curable adhesive composition. These include, for example, multifunctional (meth)acrylate monomers, heat-activated crosslinkers such as polyfunctional aziridine compounds, polyfunctional isocyanate compounds, and polyfunctional epoxy compounds, and photosensitive crosslinkers such as benzophenone-based monomers and TRIAZINE compounds. In some embodiments, the curable adhesive compositions include a combination of crosslinkers such as different types of crosslinkers.

Some example multi-functional (meth)acrylate monomers include, for example, those having two or more (meth)acryloyl groups. Specific multi-functional (meth)acrylate monomers having two (meth)acryloyl groups include, but are not limited to, 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, and neopentylglycol hydroxypivalate diacrylate modified caprolactone. Exemplary crosslinkers with three or four (meth)acryloyl groups include, but are not limited to, trimethylolpropane triacrylate (e.g., commercially available under the trade designation TMPTA-N from Surface Specialties, Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (commercially available under the trade designation SR-368 from Sartomer), a mixture of pentaerythritol triacrylate and pentaerythritol tetraacrylate (e.g., commercially available from Surface Specialties under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

Any suitable optional heat-activated crosslinker can be used in the curable adhesive composition. In many embodiments, the heat activated crosslinker is a polyfunctional aziridine compound such as 1,1'-(1,3-phthaloyl)-bis-(2-methylaziridine) (CAS No. 7652-64-4). Other useful polyfunctional aziridine compounds are described, for example, in U.S. Pat. No. 8,263,711 (Krepski et al.) and U.S. Pat. No. 8,524,836 (Kavanagh et al.). This type of crosslinker can be added to curable adhesive composition and can be reacted by heat activation after coating the curable composition on a substrate.

Any suitable optional photosensitive crosslinker can be used in the curable adhesive composition. This type of crosslinker can be compounds that have an aromatic group that is crosslinkable when exposed to ultraviolet radiation and that have a polymerizable groups such as a (meth)acryloyl group. When exposed to UV radiation, the aromatic groups can abstract a hydrogen atom from another polymeric chain or another portion of the same polymeric chain. This abstraction results in the formation of crosslinks between polymeric chains or within the same polymeric chain. These compound are further described, for example, in U.S. Pat. No. 4,737,559 (Kellen et al.). In many embodiments, the aromatic ketone group is a derivative of benzophenone (i.e., a benzophenone-containing group) that have a (meth)acryloyl group. Examples of the photosensitive crosslinkers include, but are not limited to, 4-(meth)acryloyloxybenzophenone, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, 4-acryloyloxyethoxy-4'-bromobenzophenone, and the like.

Other types of photosensitive crosslinkers are TRIAZINE compounds. Such compounds are described, for example, in U.S. Pat. No. 4,391,687 (Vesley). One example TRIAZINE compound is 2,4-bis(trichloromethyl)-6-(4-methoxyphenyl)-TRIAZINE.

The amount of the optional crosslinkers in the curable adhesive composition is often in a range of 0 to 5 weight percent based on a total weight of the first syrup polymer. If present, the amount is often at least 0.01 weight percent, at least 0.02 weight percent, at least 0.05 weight percent, at least 0.1 weight percent, at least 0.2 weight percent, or at least 0.5 weight percent. The amount can be up to 5 weight percent, up to 3 weight percent, up to 2 weight percent, or up to 1 weight percent.

In some embodiments, the curable adhesive composition includes only the high glass transition temperature (meth)acrylate polymer tackifier and the low glass transition temperature (meth)acrylate polymer tackifier discussed above as the tackifier. In other embodiments, the curable adhesive composition includes a third optional tackifier in addition to the high glass transition temperature (meth)acrylate polymer tackifier and the low glass transition temperature (meth)acrylate polymer tackifier. The third optional tackifier can be added to further enhance the characteristics of the resulting pressure-sensitive adhesive obtained from the curable adhesive composition. Because the monomers in the first syrup polymer are typically polymerized in the presence of the third optional tackifier, care must be taken in the selection of the third optional tackifier so that it does not substantially impede the polymerization process by acting, for example, as a free radical scavenger, a chain termination agent, or a chain transfer agent.

The third optional tackifiers can be conventional tackifiers such as those based rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesives. Combinations of various tackifiers can be used, if desired.

Tackifiers that are rosin esters are the reaction products of various rosin acids and alcohols. These include, but are not limited to, methyl esters of rosin acids, triethylene glycol esters of rosin acids, glycerol esters of rosin acids, and pentaerythritol esters of rosin acids. These rosin esters can be hydrogenated partially or fully to improve stability and reduce their color contribution to the pressure-sensitive adhesives. The rosin resin tackifiers are commercially available, for example, from Eastman Chemical Company (Kingsport, Tenn., USA) under the trade designations PERMALYN, STAYBELITE, and FORAL as well as from Newport Industries (London, England) under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Tackifiers that are hydrocarbon resins can be prepared from various petroleum-based feed stocks. These feedstocks can be aliphatic hydrocarbons (mainly C5 monomers with some other monomers present such as a mixture of trans-1, 3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color and thermal stability.

The C5-based hydrocarbon resins are commercially available from Eastman Chemical Company under the trade designations PICCOTAC and EASTOTAC, from Cray Valley (Exton, Pa., USA) under the trade designation WINGTACK, from Neville Chemical Company (Pittsburgh, Pa., USA) under the trade designation NEVTAC LX, and from Kolon Industries, Inc. (South Korea) under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley (Exton, Pa., USA) under the trade designations NORSOLENE, from Ruetgers N.V. (Belgium) under the trade designation NOVAREZ, and from Kolon Industries, Inc. (South Korea) under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREX that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa (Germany) under the trade designation ARKON, from Zeon Corporation (Japan) under the trade designation QUINTONE, from Exxon Mobile Chemical (Houston, Tex.) under the trade designation ESCOREZ, and from Newport Industries (London, England) under the trade designations NURES and H-REZ.

Various terpene resins such as terpene phenolic copolymers are commercially available from Yasuhara Chemical Co., Ltd (Hiroshima, Japan). These include, for example, those available under the trade designation TH130.

The third optional tackifier can be added in an amount in a range of 0 to 50 weight percent based on the weight of the first syrup. If present, the amount can be at least 1 weight percent, at least 2 weight percent, at least 5 weight percent, or at least 10 weight percent. The amount can be up to 50 weight percent, up to 45 weight percent, up to 40 weight percent, up to 35 weight percent, up to 30 weight percent, or up to 25 weight percent. In some embodiments, the curable adhesive compositions are free of the third optional tackifier.

Other optional additives that can be included in the curable adhesive composition provided that they do not adversely impact the performance of the resulting pressure-sensitive adhesive obtained from the curable adhesive composition. Suitable additives include, for example, plasticizers, dyes, antioxidants, glass fibers, silane coupling agents, and UV stabilizers and the like. Other materials can be added to provide pressure-sensitive adhesives with special characteristics such as electrical conductivity, magnetic properties, thermal conductivity, or a combination thereof. These special characteristics can be obtained by addition of materials known to produce such special characteristics such as various particles, short fibers, flakes, and the like.

Cured Adhesive Composition

Upon exposure to ultraviolet radiation, the curable adhesive composition reacts to form the cured adhesive composition. That is, the cured adhesive composition is the reaction product that results from exposure of the curable composition to ultraviolet radiation.

More specifically, the cured adhesive composition is an ultraviolet cured reaction product of a curable adhesive composition. The curable adhesive composition includes (a) a first syrup polymer formed from a first reaction mixture, (b) a high glass transition temperature (meth)acrylate polymer tackifier having a Tg of at least 5° C., (c) a low glass transition temperature (meth)acrylate polymer tackifier having a Tg no greater than 0° C. and (d) an ultraviolet photoinitiator. The first reaction mixture used to form the first syrup polymer contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture.

The cured adhesive composition is a pressure-sensitive adhesive that contains the high glass transition temperature (meth)acrylate polymer tackifier, the low glass transition temperature (meth)acrylate polymer tackifier and the acid-functionalized (meth)acrylate copolymer. The high glass transition temperature (meth)acrylate polymer tackifier and the low glass transition temperature (meth)acrylate polymer tackifier are typically miscible with the acid-functionalized (meth)acrylate copolymer. That is, these three materials often form a single phase within the pressure-sensitive adhesive.

Ultraviolet curing systems can be classified as a radical system or a cation system, both of which are different in curing mechanism and components. With the radical system, radicals generated from the photoinitiator upon exposure to ultraviolet radiation trigger the polymerization and/or polymeric crosslinking of monomers and copolymers. With the cation system, a strong protonic acid is generated from the photoinitiator upon exposure to ultraviolet radiation. These cations catalyze an addition polymerization reaction to cure (polymerize and/or crosslink) the resin. The cation curing system tends to be sensitive to moisture so the radical system is often preferred. Radical polymerization reactions offer advantages such as high speed, minimal influence from the environment conditions, and easy implementation. Accordingly, it is preferred that the cured adhesive compositions are formed using a radical system.

With a radical system, the ultraviolet radical curing follows the following steps: (1) generation of radicals: after exposed to ultraviolet, the radical photoinitiator is excited to decompose to generate radicals; (2) chain initiation: radicals generated by the initiator initiate the unsaturated double bonds in resins and monomer molecules to generate new radicals; (3) chain extension: radicals generated by resins and monomers may further initiate the unsaturated double bonds in resins and monomer molecules to generate radicals for radical chain reaction; and (4) chain termination: in chemical reactions, the radicals are very prone to radical coupling or acidification to terminate the chain reaction, due to their uncoupled electrons. As a result of the above reactions, the curable adhesive composition changes from a syrup to a cured adhesive composition that is a pressure-sensitive adhesive.

There are three types of the ultraviolet sources: (1) light source of low intensity such as black light, typically having an intensity within the wavelength range of from 280 to 400 nanometer of 10 mw/cm$^2$ or less (for example, measured by using UVIMAP™ UM 365 L-S radiometer produced by General Electronic Instrument Technology Co., Ltd (Virginia, USA) in accordance with the procedure approved by United States National Institute of Standards and Technology), (2) the light source of high intensity such as medium pressure mercury lamp, typically having an intensity of more than 10 mw/cm$^2$ and that can have an intensity up to 600 mw/cm$^2$ or greater, and (3) light emitting diode lights (LEDs), having many advantages, such as significantly longer service life, much lower heat generation, environmental friendly, lower energy consumption and high intensity can be achieved. Some ultraviolet sources have an intensity between 15 and 450 mw/cm$^2$. In some embodiments, short exposure times with high intensity ultraviolet radiation is desired. For example, an intensity of 600 mw/cm$^2$ and a time of exposure of 1 second may be used. The intensity range may be from about 0.1 to about 150 mw/cm$^2$, from about 0.5 to 100 mw/cm$^2$, or from about 0.5 to 50 mw/cm$^2$.

A method of making a pressure-sensitive adhesive is provided. The method includes forming a first syrup polymer from a first reaction mixture that contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture. The method further includes providing a high glass transition temperature (meth)acrylate polymer tackifier having a Tg of at least 5° C. and a low glass transition temperature (meth)acrylate polymer tackifier having a Tg no greater than 0° C. The method still further includes combining the first syrup polymer, the high glass transition temperature (meth)acrylate polymer tackifier, the low glass transition temperature (meth)acrylate polymer tackifier, and an ultraviolet photoinitiator to prepare a curable adhesive composition and then curing the curable adhesive composition with ultraviolet radiation to prepare a cured adhesive composition that is the pressure-sensitive adhesive.

The cured adhesive composition can often be formed by applying the curable adhesive composition to a suitable support and then exposing the coated curable adhesive composition to ultraviolet radiation. The support onto which the curable adhesive composition is applied can be rigid or flexible, clear or opaque, and prepared of any desired material such as polymeric material, glass or ceramic material, metals, or the like. In many embodiments, the support is a polymeric material such as flexible polymeric film, which can be referred to as a flexible backing. Suitable polymeric materials include, for example, polyolefins such as polyethylene, and polypropylene (including isotactic polypropylene); polystyrenes; polyesters such as poly(ethylene terephthalate), poly(butylene terephthalate), polylactides, and poly(caprolactams); nylon; polyvinyl alcohols; poly(vinylidene fluorides); and cellulosic materials such as cellulose acetate and ethyl cellulose. If desired, the flexible substrates can have a specific microstructured surface, such as those as described, for example, in U.S. Pat. No. 5,141,790 (Calhoun et al.), U.S. Pat. No. 5,296,277 (Wilson et al.), and U.S. Pat. No. 5,362,516 (Wilson et al.). These microstructured surfaces are often obtained by micro-replication techniques.

Other suitable supports can be prepared from various fabrics, such as fabrics formed from synthetic fibers or natural fibers. The fabrics can be woven or non-woven. Suitable fibers include, but are not limited to, cotton, nylon, rayon, glass, and ceramic materials. Still other suitable supports include metal sheets or foils, metalized polymer film, and ceramic sheets. Yet other suitable supports include foams such as, for example, acrylic foams, polyethylene foams, polyurethane foams, or neoprene foams.

The curable adhesive composition can be applied to the support using any suitable method such as, for example, roller coating, flow coating, dip coating, spin coating, spray coating, blade coating, die coating, and the like. These different coating methods allow application of various thicknesses of the curable adhesive composition on the support. The thickness of coatings may vary, with a typical thickness of cured adhesive composition being in a range from 2 to 500 micrometers or in a range of 25 to 250 micrometers.

The cured adhesive composition is typically a (meth) acrylate pressure-sensitive adhesive. The (meth)acrylate pressure-sensitive adhesive that can be used in various articles that are typically prepared from such adhesives. For example, the (meth)acrylate pressure-sensitive adhesive can be formed on a release layer to form a transfer adhesive tape. In other adhesive tapes, the (meth)acrylate pressure-sensitive adhesive is adhered to a backing layer that is typically a flexible polymeric film (backing) to form an adhesive tape. The adhesive tape can have the (meth)acrylate pressure-sensitive adhesive adhered to one side or to both sides of the backing.

Various embodiments are provided that are curable adhesive compositions, cured adhesive compositions, methods of making a pressure-sensitive adhesive, or a pressure-sensitive adhesive.

Embodiment 1 is a curable adhesive composition that includes (a) a first syrup polymer formed from a first reaction mixture, (b) a high glass transition temperature (meth)acrylate polymer tackifier having a Tg of at least 5° C., (c) a low glass transition temperature (meth)acrylate polymer tackifier having a Tg no greater than 0° C., and (d) an ultraviolet photoinitiator. The first reaction mixture used to form the first syrup polymer contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture.

Embodiment 2 is the curable adhesive composition of embodiment 1, wherein the weight average molecular weight of the high glass transition temperature (meth)acrylate polymer tackifier is in a range of 10,000 to 150,000 grams/mole (Daltons).

Embodiment 3 is the curable adhesive composition of embodiment 1 or 2, wherein the weight average molecular weight of the low glass transition temperature (meth)acrylate polymer tackifier is in a range of 15,000 to 120,000 grams/mole (Daltons).

Embodiment 4 is the curable adhesive composition of any one of embodiments 1 to 3, wherein the curable adhesive composition comprises 2 to 29 weight percent high glass transition temperature (meth)acrylate polymer tackifier based on a total weight of the first syrup polymer.

Embodiment 5 is the curable adhesive composition of any one of embodiments 1 to 4, wherein the curable adhesive composition comprises 2 to 15 weight percent low glass transition temperature (meth)acrylate polymer tackifier based on a total weight of the first syrup polymer.

Embodiment 6 is the curable adhesive composition of any one of embodiments 1 to 5, wherein the weight average molecular weight of the high glass transition temperature (meth)acrylate polymer tackifier is in a range of 10,000 to 100,000 grams/mole (Daltons).

Embodiment 7 is the curable adhesive composition of any one of embodiments 1 to 6, wherein the weight average molecular weight of the low glass transition temperature (meth)acrylate polymer tackifier is in a range of 15,000 to 90,000 grams/mole (Daltons).

Embodiment 8 is the curable adhesive composition of any one of embodiments 1 to 7, wherein the Tg of the high glass transition temperature (meth)acrylate polymer tackifier is at least 10° C.

Embodiment 9 is the curable adhesive composition of any one of embodiments 1 to 8, wherein the Tg of the low glass transition temperature (meth)acrylate polymer tackifier is no greater than −10° C.

Embodiment 10 is the curable adhesive composition of any one of embodiments 1 to 9, wherein the first reaction mixture comprises 45 to 99.5 weight percent of the non-tertiary alkyl acrylate.

Embodiment 11 is the curable adhesive composition of any one of embodiments 1 to 10, wherein the first reaction mixture comprises (1) 45 to 99.5 weight percent of the non-tertiary alkyl acrylate, (2) 0.5 to 15 weight percent of an acid-functionalized ethylenically unsaturated monomer, (3) 0 to 40 weight percent of an optional high Tg (meth)acrylate monomer whose Tg is higher than the Tg value of the non-tertiary alkyl acrylate monomer, (4) 0 to 10 weight percent of an optional non-acidic ethylenically unsaturated polar monomer, (5) 0 to 5 weight percent of an optional other vinyl monomer, and (6) 0 to 5 weight percent of an optional multi-functional (meth)acrylate monomer. Each weight percent is based on a total weight of monomers in the first reaction mixture.

Embodiment 12 is the curable adhesive composition of embodiment 11, wherein the first reaction mixture comprises (1) 85 to 99.5 weight percent of a sum of the non-tertiary alkyl acrylate and the optional high Tg (meth)acrylate monomer, and (2) 0.5 to 15 weight percent of the acid-functionalized ethylenically unsaturated monomer.

Embodiment 13 is the curable adhesive composition of any one of embodiments 1 to 12, wherein the low glass transition temperature (meth)acrylate polymer tackifier is formed from a second reaction mixture comprising (1) 30 to 99.5 weight percent of a non-tertiary alkyl acrylate, (2) 0.5 to 15 weight percent of an acid-functionalized ethylenically unsaturated monomer, (3) 0 to 60 weight percent of an optional high Tg (meth)acrylate monomer whose Tg is higher than the Tg value of the non-tertiary alkyl acrylate monomer, (4) 0 to 40 weight percent of an optional non-acidic ethylenically unsaturated polar monomer, (5) 0 to 40 weight percent of optional other vinyl monomers, and (6) 0 to 5 weight percent of an optional multi-functional (meth)acrylate monomer. Each weight percent is based on a total weight of monomers in the second reaction mixture.

Embodiment 14 is the curable adhesive composition of any one of embodiments 1 to 13, wherein the high glass transition temperature (meth)acrylate polymer tackifier is formed from a third reaction mixture comprising (1) 30 to 99.5 weight percent of a non-tertiary alkyl acrylate, (2) 0.5 to 15 weight percent of an acid-functionalized ethylenically unsaturated monomer, (3) 0 to 60 weight percent of an optional high Tg (meth)acrylate monomer whose Tg is higher than the Tg value of the non-tertiary alkyl acrylate monomer, (4) 0 to 40 weight percent of an optional non-acidic ethylenically unsaturated polar monomer, (5) 0 to 40 weight percent of optional other vinyl monomers, and (6) 0 to 5 weight percent of an optional multi-functional (meth)acrylate monomer. Each weight percent is based on a total weight of monomers in the third reaction mixture.

Embodiment 15 is the curable adhesive composition of embodiment 13, wherein the low glass transition temperature (meth)acrylate polymer tackifier is in the form of a second syrup polymer that comprises (i) 70 to 99.5 weight percent of a partially polymerized (meth)acrylate tackifier based on a total weight of monomers in the second reaction mixture, and (ii) 0.5 to 30 weight percent un-reacted monomers. Each weight percent is based on a total weight of monomers in the second reaction mixture.

Embodiment 16 is the curable adhesive composition of embodiment 14, wherein the high glass transition temperature (meth)acrylate polymer tackifier is in the form of a completely polymerized material that comprises (i) 90 to 99.9 weight percent of a partially polymerized (meth)acrylate tackifier based on a total weight of monomers in the third reaction mixture, and (ii) 0.1 to 10 weight percent un-reacted monomers. Each weight percent is based on a total weight of monomers in the third reaction mixture.

Embodiment 17 is the curable adhesive composition of any one of embodiments 1 to 16, further comprising a third tackifier resin that is different than the high glass transition temperature (meth)acrylate polymer tackifier and the low glass transition temperature (meth)acrylate polymer tackifier.

Embodiment 18 is the curable adhesive composition of embodiment 17, wherein the third tackifier can be selected from the group consisting of a hydrocarbon resin tackifier, a hydrogenated terpene phenol resin tackifier and hydrogenated rosin tackifier.

Embodiment 19 is the curable adhesive composition of any one of embodiments 1 to 18, further comprising a photo-sensitive crosslinker.

Embodiment 20 is the curable adhesive composition of any one of embodiments 1 to 19, wherein the weight average molecular weight of the partially polymerized acid-functionalized (meth)acrylate copolymer is greater than 1,000,000 grams/mole (Daltons).

Embodiment 21 is a cured adhesive composition that is an ultraviolet cured reaction product of a curable adhesive composition. The curable adhesive composition includes (a) a first syrup polymer formed from a first reaction mixture, (b) a high glass transition temperature (meth)acrylate polymer tackifier having a Tg of at least 5° C., (c) a low glass transition temperature (meth)acrylate polymer tackifier having a Tg no greater than 0° C., and (d) an ultraviolet photoinitiator. The first reaction mixture used to form the first syrup polymer contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture. The cured adhesive composition is a pressure-sensitive adhesive.

Embodiment 22 is the cured adhesive composition of embodiments 21, wherein the weight average molecular weight of the high glass transition temperature (meth)acrylate polymer tackifier is in a range of 10,000 to 150,000 grams/mole (Daltons).

Embodiment 23 is the cured adhesive composition of embodiment 21 or 22, wherein the weight average molecular weight of the low glass transition temperature (meth)acrylate polymer tackifier is in a range of 15,000 to 120,000 grams/mole (Daltons).

Embodiment 24 is the cured adhesive composition of any one of embodiments 21 to 23, wherein the curable adhesive composition comprises 2 to 29 weight percent high glass transition temperature (meth)acrylate polymer tackifier based on a total weight of the first syrup polymer.

Embodiment 25 is the cured adhesive composition of any one of embodiments 21 to 24, wherein the curable adhesive composition comprises 2 to 15 weight percent low glass transition temperature (meth)acrylate polymer tackifier based on a total weight of the first syrup polymer.

Embodiment 26 is the cured adhesive composition of any one of embodiments 21 to 25, wherein the weight average molecular weight of the high glass transition temperature (meth)acrylate polymer tackifier is in a range of 10,000 to 100,000 grams/mole (Daltons).

Embodiment 27 is the cured adhesive composition of any one of embodiments 21 to 26, wherein the weight average molecular weight of the low glass transition temperature (meth)acrylate polymer tackifier is in a range of 15,000 to 90,000 grams/mole (Daltons).

Embodiment 28 is the cured adhesive composition of any one of embodiments 21 to 27, wherein the Tg of the high glass transition temperature (meth)acrylate polymer tackifier is at least 10° C.

Embodiment 29 is the cured adhesive composition of any one of embodiments 21 to 28, wherein the Tg of the low glass transition temperature (meth)acrylate polymer tackifier is no greater than −10° C.

Embodiment 30 is the cured adhesive composition of any one of embodiments 21 to 29, wherein the first reaction mixture comprises 45 to 99.5 weight percent of the non-tertiary alkyl acrylate.

Embodiment 31 is the cured adhesive composition of any one of embodiments 21 to 30, wherein the first reaction mixture comprises (1) 45 to 99.5 weight percent of the non-tertiary alkylacrylate, (2) 0.5 to 15 weight percent of an acid-functionalized ethylenically unsaturated monomer, (3) 0 to 40 weight percent of an optional high Tg (meth)acrylate monomer whose Tg is higher than the Tg value of the non-tertiary alkyl acrylate monomer, (4) 0 to 10 weight percent of an optional non-acidic ethylenically unsaturated polar monomer, (5) 0 to 5 weight percent of an optional other vinyl monomer, and (6) 0 to 5 weight percent of an optional multi-functional (meth)acrylate monomer. Each weight percent is based on a total weight of monomers in the first reaction mixture.

Embodiment 32 is the cured adhesive composition of embodiment 31, wherein the first reaction mixture comprises (1) 85 to 99.5 weight percent of a sum of the non-tertiary alkyl acrylate and the optional high Tg (meth)acrylate monomer, and (2) 0.5 to 15 weight percent of the acid-functionalized ethylenically unsaturated monomer.

Embodiment 33 is the cured adhesive composition of any one of embodiments 21 to 32, wherein the low glass transition temperature (meth)acrylate polymer tackifier is formed from a second reaction mixture comprising (1) 30 to 99.5 weight percent of a non-tertiary alkyl acrylate, (2) 0.5 to 15 weight percent of an acid-functionalized ethylenically unsaturated monomer, (3) 0 to 60 weight percent of an optional high Tg (meth)acrylate monomer whose Tg is higher than the Tg value of the non-tertiary alkyl acrylate monomer, (4) 0 to 40 weight percent of an optional non-acidic ethylenically unsaturated polar monomer, (5) 0 to 40 weight percent of optional other vinyl monomers, and (6) 0 to 5 weight percent of an optional multi-functional (meth)acrylate monomer. Each weight percent is based on a total weight of monomers in the second reaction mixture.

Embodiment 34 is the cured adhesive composition of any one of embodiments 21 to 33, wherein the high glass transition temperature (meth)acrylate polymer tackifier is formed from a third reaction mixture comprising (1) 30 to 99.5 weight percent of a non-tertiary alkyl acrylate, (2) 0.5 to 15 weight percent of an acid-functionalized ethylenically unsaturated monomer, (3) 0 to 60 weight percent of an optional high Tg (meth)acrylate monomer whose Tg is higher than the Tg value of the non-tertiary alkyl acrylate monomer, (4) 0 to 40 weight percent of an optional non-acidic ethylenically unsaturated polar monomer, (5) 0 to 40 weight percent of optional other vinyl monomers, and (6) 0 to 5 weight percent of an optional multi-functional (meth)acrylate monomer. Each weight percent is based on a total weight of monomers in the third reaction mixture.

Embodiment 35 is the cured adhesive composition of embodiment 33, wherein the low glass transition temperature (meth)acrylate polymer tackifier is in the form of a second syrup polymer that comprises (i) 70 to 99.5 weight percent of a partially polymerized (meth)acrylate tackifier based on a total weight of monomers in the second reaction mixture, and (ii) 0.5 to 30 weight percent un-reacted monomers. Each weight percent is based on a total weight of monomers in the second reaction mixture.

Embodiment 36 is the cured adhesive composition of embodiment 34, wherein the high glass transition temperature (meth)acrylate polymer tackifier is in the form of a completely polymerized material that comprises (i) 90 to 99.9 weight percent of a partially polymerized (meth)acrylate tackifier based on a total weight of monomers in the third reaction mixture, and (ii) 0.1 to 10 weight percent un-reacted monomers. Each weight percent is based on a total weight of monomers in the third reaction mixture.

Embodiment 37 is the cured adhesive composition of any one of embodiments 21 to 36, further comprising a third tackifier resin that is different than the high glass transition temperature (meth)acrylate polymer tackifier and the low glass transition temperature (meth)acrylate polymer tackifier.

Embodiment 38 is the cured adhesive composition of embodiment 37, wherein the third tackifier can be selected from the group consisting of a hydrocarbon resin tackifier, a hydrogenated terpene phenol resin tackifier and hydrogenated rosin tackifier.

Embodiment 39 is the cured adhesive composition of any one of embodiments 21 to 38, further comprising a photo-sensitive crosslinker.

Embodiment 40 is the cured adhesive composition of any one of embodiments 21 to 39, wherein the weight average molecular weight of the partially polymerized acid-functionalized (meth)acrylate copolymer is greater than 1,000,000 grams/mole (Daltons).

Embodiment 41 is a pressure-sensitive adhesive. The pressure-sensitive adhesive includes (a) a acid-functionalized (meth)acrylate copolymer having a weight average molecular weight greater than 500,000 grams/mole (Daltons); and (b) a high glass transition temperature (meth)acrylate polymer tackifier having a Tg of at least 5° C.; and (c) a low glass transition temperature (meth)acrylate polymer tackifier having a Tg no greater than 0° C.

Embodiment 42 is the pressure-sensitive adhesive of embodiment 41, wherein the pressure-sensitive adhesive comprises 2 to 29 weight percent high glass transition temperature (meth)acrylate polymer tackifier based on a total weight of the pressure-sensitive adhesive.

Embodiment 43 is the pressure-sensitive adhesive of any one of embodiments 41 or 42, wherein the pressure-sensitive adhesive comprises 2 to 15 weight percent low glass transition temperature (meth)acrylate polymer tackifier based on a total weight of the pressure-sensitive adhesive.

Embodiment 44 is the pressure-sensitive adhesive of any one of embodiments 41 to 43, wherein the weight average molecular weight of the high glass transition temperature (meth)acrylate polymer tackifier is in a range of 10,000 to 150,000 grams/mole (Daltons).

Embodiment 45 is the pressure-sensitive adhesive of any one of embodiments 41 to 44, wherein the weight average molecular weight of the low glass transition temperature (meth)acrylate polymer tackifier is in a range of 15,000 to 120,000 grams/mole (Daltons).

Embodiment 46 is the pressure-sensitive adhesive of any one of embodiments 41 to 45, wherein the weight average molecular weight of the high glass transition temperature (meth)acrylate polymer tackifier is in a range of 10,000 to 100,000 grams/mole (Daltons).

Embodiment 47 is the pressure-sensitive adhesive of any one of embodiments 41 to 46, wherein the weight average molecular weight of the low glass transition temperature (meth)acrylate polymer tackifier is in a range of 15,000 to 90,000 grams/mole (Daltons).

Embodiment 48 is the pressure-sensitive adhesive of any one of embodiments 41 to 47, wherein the Tg of the high glass transition temperature (meth)acrylate polymer tackifier is at least 10° C.

Embodiment 49 is the pressure-sensitive adhesive of any one of embodiments 41 to 48, wherein the Tg of the low glass transition temperature (meth)acrylate polymer tackifier is no greater than −10° C.

Embodiment 50 is the pressure-sensitive adhesive of any one of embodiments 41 to 49, further comprising a third tackifier resin that is different than the high glass transition temperature (meth)acrylate polymer tackifier and the low glass transition temperature (meth)acrylate polymer tackifier.

Embodiment 51 is the pressure-sensitive adhesive of embodiment 50 wherein the third tackifier can be selected from the group consisting of a hydrocarbon resin tackifier, a hydrogenated terpene phenol resin tackifier and hydrogenated rosin tackifier.

Embodiment 52 is the pressure-sensitive adhesive, wherein the pressure-sensitive adhesive is prepared from a curable adhesive composition that includes (a) a first syrup polymer formed from a first reaction mixture, (b) a high glass transition temperature (meth)acrylate polymer tackifier having a Tg of at least 5° C., (c) a low glass transition temperature (meth)acrylate polymer tackifier having a Tg no greater than 0° C., and (d) an ultraviolet photoinitiator. The first reaction mixture used to form the first syrup polymer contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture.

Embodiment 53 is a method of making a pressure-sensitive adhesive. The method includes the step of combining and curing the adhesive composition of any one of embodiments 1 to 20.

Embodiment 54 is the method of embodiment 53, wherein the method includes forming a first syrup polymer from a first reaction mixture that contains (1) a non-tertiary alkyl acrylate and (2) an acid-functionalized ethylenically unsaturated monomer. The first syrup polymer contains (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons) and (ii) 70 to 99 weight percent of un-reacted monomers based on the total weight of monomers in the first reaction mixture. The method further includes providing a high glass transition temperature (meth)acrylate polymer tackifier having a Tg of at least 5° C. and a low glass transition temperature (meth)acrylate polymer tackifier having a Tg no greater than 0° C. The method still further includes combining the first syrup polymer, the high glass transition temperature (meth)acrylate polymer tackifier, the low glass transition temperature (meth)acrylate polymer tackifier, and an ultraviolet photoinitiator to prepare a curable adhesive composition and then curing the curable adhesive composition with ultraviolet radiation to prepare a cured adhesive composition that is the pressure-sensitive adhesive.

Embodiment 55 is the method of embodiment 54, wherein the weight average molecular weight of the high glass transition temperature (meth)acrylate polymer tackifier is in a range of 10,000 to 150,000 grams/mole (Daltons).

Embodiment 56 is the method of embodiment 54 or 55, wherein the weight average molecular weight of the low glass transition temperature (meth)acrylate polymer tackifier is in a range of 15,000 to 120,000 grams/mole (Daltons).

Embodiment 57 is the method of any one of embodiments 54 to 56, wherein the curable adhesive composition comprises 2 to 29 weight percent high glass transition temperature (meth)acrylate polymer tackifier based on a total weight of the first syrup polymer.

Embodiment 58 is the method of any one of embodiments 54 to 57, wherein the curable adhesive composition comprises 2 to 15 weight percent low glass transition temperature (meth)acrylate polymer tackifier based on a total weight of the first syrup polymer.

Embodiment 59 is the method of any one of embodiments 54 to 58, wherein the weight average molecular weight of the high glass transition temperature (meth)acrylate polymer tackifier is in a range of 10,000 to 100,000 grams/mole (Daltons).

Embodiment 60 is the method of any one of embodiments 54 to 59, wherein the weight average molecular weight of the low glass transition temperature (meth)acrylate polymer tackifier is in a range of 15,000 to 90,000 grams/mole (Daltons).

Embodiment 61 is the method of any one of embodiments 54 to 60, wherein the Tg of the high glass transition temperature (meth)acrylate polymer tackifier is at least 10° C.

Embodiment 62 is the method of any one of embodiments 54 to 61, wherein the Tg of the low glass transition temperature (meth)acrylate polymer tackifier is no greater than −10° C.

Embodiment 63 is the method of any one of embodiments 54 to 62, wherein the first reaction mixture comprises 45 to 99.5 weight percent of the non-tertiary alkyl acrylate.

Embodiment 64 is the method of any one of embodiments 54 to 63, wherein the first reaction mixture comprises (1) 45 to 99.5 weight percent of the non-tertiary alkylacrylate, (2) 0.5 to 15 weight percent of an acid-functionalized ethylenically unsaturated monomer, (3) 0 to 40 weight percent of an optional high Tg (meth)acrylate monomer whose Tg is higher than the Tg value of the non-tertiary alkyl acrylate monomer, (4) 0 to 10 weight percent of an optional non-acidic ethylenically unsaturated polar monomer, (5) 0 to 5 weight percent of an optional other vinyl monomer, and (6) 0 to 5 weight percent of an optional multi-functional (meth) acrylate monomer. Each weight percent is based on a total weight of monomers in the first reaction mixture.

Embodiment 65 is the method of embodiment 64, wherein the first reaction mixture comprises (1) 85 to 99.5 weight percent of a sum of the non-tertiary alkyl acrylate and the optional high Tg (meth)acrylate monomer, and (2) 0.5 to 15 weight percent of the acid-functionalized ethylenically unsaturated monomer.

Embodiment 66 is the method of any one of embodiments 54 to 65, wherein the low glass transition temperature (Tg) (meth)acrylate polymer tackifier is formed from a second reaction mixture comprising (1) 30 to 99.5 weight percent of a non-tertiary alkyl acrylate, (2) 0.5 to 15 weight percent of an acid-functionalized ethylenically unsaturated monomer, (3) 0 to 60 weight percent of an optional high Tg (meth) acrylate monomer whose Tg is higher than the Tg value of the non-tertiary alkyl acrylate monomer, (4) 0 to 40 weight percent of an optional non-acidic ethylenically unsaturated polar monomer, (5) 0 to 40 weight percent of optional other vinyl monomers, (6) 0 to 5 weight percent of an optional multi-functional (meth)acrylate monomer. Each weight percent is based on a total weight of monomers in the second reaction mixture.

Embodiment 67 is the method of any one of embodiments 54 to 66, wherein the high glass transition temperature (meth)acrylate polymer tackifier is formed from a third reaction mixture comprising (1) 30 to 99.5 weight percent of a non-tertiary alkyl acrylate, (2) 0.5 to 15 weight percent of an acid-functionalized ethylenically unsaturated monomer, (3) 0 to 60 weight percent of an optional high Tg (meth) acrylate monomer whose Tg is higher than the Tg value of the non-tertiary alkyl acrylate monomer, (4) 0 to 40 weight percent of an optional non-acidic ethylenically unsaturated polar monomer, (5) 0 to 40 weight percent of optional other vinyl monomers, and (6) 0 to 5 weight percent of an optional multi-functional (meth)acrylate monomer. Each weight percent is based on a total weight of monomers in the third reaction mixture.

Embodiment 68 is the method of embodiment 66, wherein the low glass transition temperature (meth)acrylate polymer tackifier is in the form of a second syrup polymer that comprises (i) 70 to 99.5 weight percent of a partially polymerized (meth)acrylate tackifier based on a total weight of monomers in the second reaction mixture, and (ii) 0.5 to 30 weight percent un-reacted monomers. Each weight percent is based on a total weight of monomers in the second reaction mixture.

Embodiment 69 is the method of embodiment 67, wherein the high glass transition temperature (meth)acrylate polymer tackifier is in the form of a completely polymerized material that comprises (i) 90 to 99.9 weight percent of a partially polymerized (meth)acrylate tackifier based on a total weight of monomers in the third reaction mixture, and (ii) 0.1 to 10 weight percent un-reacted monomers. Each weight percent is based on a total weight of monomers in the third reaction mixture.

Embodiment 70 is the method of any one of embodiments 54 to 69, further comprising a third tackifier resin that is different than the high glass transition temperature (meth) acrylate polymer tackifier and the low glass transition temperature (meth)acrylate polymer tackifier.

Embodiment 71 is the method of embodiment 70, wherein the third tackifier can be selected from the group consisting of a hydrocarbon resin tackifier, a hydrogenated terpene phenol resin tackifier and hydrogenated rosin tackifier.

Embodiment 72 is the method of any one of embodiments 54 to 71, further comprising a photo-sensitive crosslinker.

Embodiment 73 is the method of any one of embodiments 54 to 72, wherein the weight average molecular weight of the partially polymerized acid-functionalized (meth)acrylate copolymer is greater than 1,000,000 grams/mole (Daltons).

EXAMPLES

The object and advantages of the present invention will be further illustrated with reference to the following examples. The specific materials, amounts, and other conditions and details recorded in those examples are merely used to describe the present invention and should not be construed to limit the present invention in any way. The percents, ratios, parts and the like quoted in the present invention are all by weight, unless otherwise specified.

All amounts are stated as weight percent unless otherwise indicated.

TABLE 1

| Glossary of Materials | |
|---|---|
| Abbreviation or Trade Designation | Description |
| IOA | Isooctyl acrylate, from 3M Company (Saint Paul, MN, USA) |
| 2-EHA | 2-Ethylhexyl acrylate, from Huayi acrylic Co. Ltd. (Shanghai, China) |
| BA | Butyl acrylate, from Huayi acrylic Co. Ltd. (Shanghai, China) |
| AA | Acrylic acid, from Huayi acrylic Co. Ltd. (Shanghai, China) |
| IBxA | Isobornyl acrylate, from San Ester Corp. (Osaka, Japan) |
| EEEA | 2-(2-ethoxyethoxy)ethyl acrylate, from San Ester Corp. (Osaka, Japan) |
| MA | Methyl Acrylate, from Huayi acrylic Co. Ltd. (Shanghai, China) |
| HDDA | 1,6-hexanediol diacrylate, from Cytec Co. Ltd. (Woodland Park, NJ, USA) |
| TRIAZINE | Prepared according to disclosure in U.S. Pat. No. 4,330,590 (Vesley) |
| IOTG | Iso-octyl thioglycolate, from Showa Denko Co. Ltd. (Tokyo, Japan) |
| IRGACURE 651 | Trade designation for 2,2-dimethoxy-2-phenyl-1-acetophenone, from BASF Co. Ltd., (Florham Park, NJ, USA) |
| Regreltz 6108 | Trade designation for a hydrocarbon tackifier, from Eastman Chemical Co. Ltd. (Kingsport, TN, USA) |
| TH130 | Trade designation for hydrogenated terpene phenol resins tackifier, from Yasuhara Chemical Co. Ltd. (Hiroshima, Japan) |
| PETA | Pentaerythritol triacrylate, from Cytec Co. Ltd. (Woodland Park, NJ, USA) |
| FORAL 85LB | Trade designation forglycerol ester of highly hydrogenated refined wood rosin tackifier, from Pinova Inc. (Brunswick, GA, USA) |

Test Methods

The performance testing and characterization for the samples of the present invention are carried out according to the following test methods.

Peel Adhesion Test (ASTM D 3330/D 3330M-04)

For analysis of a single-sided adhesive tape, the adhesive tape was used as prepared. The adhesive side was the test side and it was initially covered with release film CP Film T10 PET (obtained from Solutia Co., Ltd., which is a subsidiary of Eastman (Kingsport, Tenn., USA)). The backing for the single-sided adhesive tape was the original PET film backing (thickness of 0.075 mm, from Loperax, Shanghai, China). The release film was removed prior to analysis. For analysis of a double-sided adhesive tape, the release film on one side of the adhesive tape was removed and a 0.05 mm Aluminum foil (from Alcoa Inc., Commonwealth of Pennsylvania, USA) was adhered and used as backing. The other side of the adhesive tape, which was initially covered with release film, was the test side. Sample stripes of both kinds of tapes with a width of 25.4 mm and a length of about 200 mm were obtained by carefully using a cutting knife.

The test side of the adhesive tape was adhered to plates of stainless steel (SS, from Chemsultants International Co. Ltd., Ohio, USA), polycarbonate (PC, from SABIC Plastics, Shanghai, China), or polypropylene (PP, from QUADRANT Plastics, Pennsylvania, USA) after removing the release film. The sample was rolled back and forth at a speed of 304.8 mm/minute with a 2 kilogram rubber roller. After a specific time, the force required for 180° peel was tested at a peel speed of 305 mm/minute using an Instron 3343 (from Chemsultants International Co. Ltd., Ohio, USA). The average value was calculated from three tape samples and reported as N/mm. The samples were held under various conditions before testing: Condition A was at 23±2° C./50±5% RH (relative humidity) for 20 minutes, Condition B was 23±2° C./50±5% RH for 3 days, and Condition C was 65° C./95% RH for 7 days followed by 23±2° C./50±5% RH for 1 day, then tested with Condition A.

High Temperature (70° C.) Shear Test (ASTM D-3654/D 3654M 06, PSTC-7)

For analysis of a single-sided adhesive tape, the adhesive tape was used as prepared. The adhesive side was the test side and it was initially covered with release film CP Film T10 PET (obtained from Solutia Co., Ltd., which is a subsidiary of Eastman (Kingsport, Tenn., USA)). The backing for the single-sided adhesive tape was a 0.05 mm Aluminum foil (from Alcoa Inc., Commonwealth of Pennsylvania, USA). The release film was removed prior to analysis. For analysis of a double-sided adhesive tape, the release film on one side of the adhesive tape was removed and a 0.05 mm Aluminum foil (from Alcoa Inc., Commonwealth of Pennsylvania, USA) was adhered and used as backing. The other side of the adhesive tape, which was initially covered with release film, was the test side. Sample stripes of both kinds of tapes with a width of 12.7 mm and a length of about 150 mm were obtained by carefully using a cutting knife.

The tape was adhered to a stainless steel plate after partially removing the release film. The bonding area of the adhesive on the SS plate was 25.4 mm×12.7 mm. The portion of the adhesive tape not adhered to the SS plate was folded over the center of an adapter hook and stapled to hold it in place. The portion of the adhesive tape adhered to the SS plate was rolled back and forth at a speed of 305 mm/minute with a 2 kg rubber roller. The test specimens were held at 23° C.±2/50±5% RH (relative humidity) for 20 minutes before testing. The test specimens were mounted in a shear stand in a 70° C. oven. The test was carried out with a load of 1,000 grams added to the adapter hook. The test specimens were hung until failure occurred and/or the end of the test. The time to failure (minutes) and the failure mode (FM) were recorded. If the time exceeded 10,000 minutes, then the time recorded was 10,000 minutes. PO means pop off, i.e., the adhesive peels away cleanly from the plate. CF means cohesion failure, i.e., a sticky residue is left on the foil and on the plate. Both PO and CF are failure modes. Each sample was tested three times and the average time was reported.

Determination of Glass Transition Temperature (Tg)

Differential Scanning calorimetry (DSC) (Q100, from TA Co. Ltd., Delaware, US) was used to determine the glass transition temperature (Tg). Each sample was (1) equilibrated at −80° C., (2) held at −80° C. for 2 minutes, and (3) then heated to 40° C. (or to 100° C.) at a rate of 10° C./minute. The Tg corresponded to the peak temperature for the transition from a glass to a liquid.

Percent Conversion Determination

The percent conversion of the syrup polymer and the (meth)acrylate tackifier was determined by measuring the solid content (Solid %). The procedure included weighing each sample into an aluminum tray, heating the sample within the aluminum tray in an oven with forced convection heating at 105±3° C. for 60±30 minutes, removing the sample from the oven, cooling the sample for 5 minutes, and then weighing the sample. The percent conversion was calculated using the following formula.

Solids %=100[($M1$−$M2$)÷$M1$]

In this formula, M1 refers to the mass of the sample before heating and M2 refers to the mass of the sample after heating. Neither M1 nor M2 include the weight of the aluminum tray.

Molecular Weight Determination

The weight average molecular weight (Mw) of the (meth) acrylate tackifier and the partially polymerized acid-functionalized (meth)acrylate copolymer were determined by Gel Permeation Chromatography (GPC) using instrumentation available from Waters Co. Ltd., (Milford, Mass., USA). The procedure included weighing 0.1 grams of sample into a 5 mL vial and dissolving the sample with 3 mL tetrahydrofuran. The sample was further diluted, as necessary for chromatographic analysis. The sample solution was filtered through a 0.45 micrometer membrane. The filtered solution was injected into the GPC and the Mw was calculated. The GPC was calibrated using polystyrene standards of known molecular weight and using linear least squared analysis to establish a calibration curve.

Preparing First Syrup Polymer S-1, S-2, S-3 and S-4

Four first syrup polymers (S-1, S-2, S-3 and S-4) were prepared. The types and amounts of monomers as listed in Table 2 were charged to 1 quart glass jar for each sample. The photoinitiator IRGACURE 651 (0.04 phr, which corresponds to 0.04 weight percent based on the total weight of monomers) was added to the monomers in each sample. Each mixture was purged with nitrogen for 15 minutes under magnetic stirring and then exposed to a low intensity UV source (365 nm at an intensity of about 1.5 mw/cm$^2$) until a syrup polymer with a viscosity of about 1,500-7,000 cPs at room temperature (RT) was obtained. The percent conversion was 8% for S-1, 5% for S-2, 7% for S-3, and 10% for S-4, wherein the percent conversion refers to the weight percent of a partially polymerized acid-functionalized (meth)acrylate copolymer. The Mw was 4,621,000 grams/mole for S-1, 6,870,000 grams/mole for S-2, 1,450,000 grams/mole for S-3, and 2,740,000 grams/mole for S-4. The molecular weight was determined by GPC.

TABLE 2

Compositions of First Syrup Polymers S-1, S-2, S-3 and S-4

| Prep Examples | IOA (wt. %) | 2-EHA (wt. %) | BA (wt. %) | AA (wt. %) | IBxA (wt. %) |
|---|---|---|---|---|---|
| S-1 | | 95.0 | | 5.0 | |
| S-2 | 66.5 | | | 7.5 | 26.0 |
| S-3 | 98.0 | | | 2.0 | |
| S-4 | | | 50.0 | 41.0 | 9.0 |

Preparing High and Low Tg Acrylate Polymer Tackifiers HT-1 to HT-19 and LT-1

High Tg acrylate polymer tackifiers HT-1 to HT-19 and low Tg acrylate polymer tackifier LT-1 were prepared by initially forming the syrup polymers (third syrup polymers for HT-1 to HT-19 and second syrup polymer for LT-1), coating the syrup polymers as a film on a support, and then further polymerizing it by exposure to ultraviolet irradiation. The types and amounts of monomers and additives used to prepare the syrup polymers are in Table 3. The types and amounts of monomers as listed in Table 3 were charged to 1 quart glass jar. Each mixture was purged with nitrogen for 15 minutes under magnetic stirring and then exposed to a low intensity UV source (365 nm at an intensity of 1.5 mw/cm$^2$) until the syrup polymer with the desired percent conversion, which corresponds to percent solids of the syrup polymers, was obtained. Each syrup polymer was then coated between two pieces 0.05 mm thick release film (CP Film T10 PET). The thickness of each coating of the syrup polymer was controlled to be in a range of 0.1 to 0.3 mm. Each coating was irradiated by the same low intensity UV source described above for 10 to 20 minutes until copolymerization was complete. Both release films were removed to obtain the acrylate polymer tackifier. The percent solids of the syrup polymer, the percent solids of the (meth)acrylate polymer tackifier, the weight average molecular weight (Mw) and the glass transition temperature of the (meth) acrylate polymer tackifier (Tg) are included in Table 3. Each weight percent in Table 3 was based on the total weight of the monomers used to prepare the syrup polymers.

TABLE 3

Compositions and Properties of the Preparatory High and Low Tg Acrylate Polymer Tackifiers HT-1 to HT-19 and LT-1

| Prep Examples | 2-EHA (wt. %) | IOA (wt. %) | BA (wt. %) | IBxA (wt. %) | AA (wt. %) | IOTG (wt. %) | IRGACURE 651 (wt. %) | Solids of the syrup polymer (wt. %) | Solids of the (meth)acrylate polymer tackifier (wt. %) | Tg (° C.) | Mw (Da) |
|---|---|---|---|---|---|---|---|---|---|---|---|
| HT-1 | | | 36.0 | 60.0 | 4.0 | 5.00 | 1.80 | 65.13 | 99.26 | 6.1 | 6,329 |
| HT-2 | | | 36.0 | 60.0 | 4.0 | 2.40 | 1.00 | 45.14 | 99.36 | 17.7 | 13,171 |
| HT-3 | | | 36.0 | 60.0 | 4.0 | 1.20 | 0.80 | 47.43 | 99.62 | 26.3 | 25,019 |
| HT-4 | | | 36.0 | 60.0 | 4.0 | 0.50 | 0.40 | 45.59 | 99.37 | 28.2 | 56,193 |
| HT-5 | | | 36.0 | 60.0 | 4.0 | 0.25 | 0.40 | 63.36 | 99.56 | 32.9 | 91,272 |
| HT-6 | | | 36.0 | 60.0 | 4.0 | 0.15 | 0.20 | 57.19 | 99.41 | 37.5 | 102,846 |
| HT-7 | | | 36.0 | 60.0 | 4.0 | 0.10 | 0.20 | 62.01 | 99.78 | 43.6 | 131,671 |
| HT-8 | | 34.0 | | 64.0 | 2.0 | 2.40 | 1.00 | 52.62 | 99.60 | 30.3 | 13,685 |
| HT-9 | | 34.0 | | 64.0 | 2.0 | 1.80 | 0.90 | 62.16 | 99.08 | 34.9 | 21,358 |
| HT-10 | | 34.0 | | 64.0 | 2.0 | 1.35 | 0.80 | 65.21 | 99.64 | 36.2 | 33,581 |
| HT-11 | | 34.0 | | 64.0 | 2.0 | 0.95 | 0.70 | 60.86 | 99.24 | 38.1 | 42,076 |
| HT-12 | | 34.0 | | 64.0 | 2.0 | 0.55 | 0.65 | 59.39 | 99.17 | 42.3 | 62,702 |
| HT-13 | | 34.0 | | 64.0 | 2.0 | 0.35 | 0.45 | 54.51 | 99.09 | 46.2 | 79,182 |
| HT-14 | | 34.0 | | 64.0 | 2.0 | 0.20 | 0.30 | 58.83 | 99.38 | 51.1 | 110,546 |
| HT-15 | | 34.0 | | 64.0 | 2.0 | 0.15 | 0.25 | 57.42 | 99.61 | 53.6 | 121,289 |
| HT-16 | | 34.0 | | 64.0 | 2.0 | 0.08 | 0.25 | 60.43 | 99.46 | 55.4 | 152,097 |
| HT-17 | | 34.0 | | 64.0 | 2.0 | 0.06 | 0.20 | 57.42 | 99.19 | 58.1 | 206,073 |
| HT-18 | | 45.0 | | 53.0 | 2.0 | 3.00 | 1.20 | 63.77 | 99.09 | 1.5 | 23,598 |
| HT-19 | | | | 97.0 | 3.0 | 0.80 | 0.60 | 55.16 | 99.48 | 48.3 | 46,726 |
| LT-1 | 49.0 | | 48.0 | | 3.0 | 0.80 | 0.60 | 52.05 | 99.15 | −13.2 | 34,173 |

Preparing Low Tg Acrylate Polymer Tackifier LT-2 to LT-14

Syrup polymers (second syrup polymers) for the formation of the low Tg acrylate polymer tackifiers LT-2 to LT-14 were prepared. The types and amounts of monomers and additives as listed in Table 4 were charged to 1 quart glass jar. Each mixture was purged with nitrogen for 15 minutes under stirring and then exposed to a same low intensity UV source as above until the syrup polymer with the desired percent conversion, which corresponds to percent solids of the syrup polymer, was obtained. The properties of the partially polymerized acrylate polymer tackifier in the syrup are included in Table 4. Each weight percent in Table 4 was based on the total weight of the monomers used to prepare the syrup polymers.

TABLE 4

Compositions and Properties of the Preparatory Low Tg Acrylate Polymer Tackifier LT-2 to LT-14

| Prep Examples | 2-EHA (wt. %) | IOA (wt. %) | EEEA (wt. %) | BA (wt. %) | IBxA (wt. %) | MA (wt. %) | AA (wt. %) | IOTG (wt. %) | IRGACURE 651 (wt. %) | Solids of the syrup polymer (wt. %) | Tg (° C.) | Mw (Da) |
|---|---|---|---|---|---|---|---|---|---|---|---|---|
| LT-2 | 35.0 | | | 36.0 | 26.0 | | 3.0 | 1.20 | 0.80 | 89.32 | −53.9 | 21,122 |
| LT-3 | | 18.0 | 34.0 | 43.0 | | | 5.0 | 5.50 | 1.80 | 89.49 | −70.4 | 7,523 |
| LT-4 | | 18.0 | 34.0 | 43.0 | | | 5.0 | 2.50 | 1.00 | 86.78 | −68.2 | 12,576 |
| LT-5 | | 18.0 | 34.0 | 43.0 | | | 5.0 | 1.00 | 0.80 | 87.27 | −64.1 | 31,208 |
| LT-6 | | 18.0 | 34.0 | 43.0 | | | 5.0 | 0.90 | 0.90 | 90.12 | −63.9 | 40,348 |
| LT-7 | | 18.0 | 34.0 | 43.0 | | | 5.0 | 0.75 | 0.70 | 88.65 | −63.7 | 51,562 |
| LT-8 | | 18.0 | 34.0 | 43.0 | | | 5.0 | 0.55 | 0.50 | 89.81 | −63.5 | 71,349 |
| LT-9 | | 18.0 | 34.0 | 43.0 | | | 5.0 | 0.35 | 0.40 | 87.34 | −63.0 | 89,351 |
| LT-10 | | 18.0 | 34.0 | 43.0 | | | 5.0 | 0.25 | 0.40 | 88.65 | −62.5 | 105,639 |
| LT-11 | | 18.0 | 34.0 | 43.0 | | | 5.0 | 0.15 | 0.25 | 89.76 | −60.6 | 123,785 |
| LT-12 | | 18.0 | 34.0 | 43.0 | | | 5.0 | 0.10 | 0.20 | 90.23 | −58.2 | 149,246 |
| LT-13 | 56.0 | | | | | 35.0 | 9.0 | 1.80 | 1.20 | 89.16 | −34.7 | 22,193 |
| LT-14 | 56.0 | | | | | 35.0 | 9.0 | 0.80 | 0.60 | 90.30 | −27.6 | 48,657 |

Example 1-17 and Comparative Example C1-C7: Cured Adhesive Compositions

Comparative examples C1-C7 and Examples 1-17 were prepared from the curable adhesive compositions shown in Table 5. The syrup polymer S1, crosslink TRIAZINE, the photoinitiator IRGACURE 651 and other additives were charged to 1 quart glass jar. After closing each jar with a cap, the resulting mixtures were placed onto a three roller machine to mix until all the components were completely dissolved. The resulting curable adhesive compositions were clear and transparent. Each weight percent in Table 5 was based on the total weight of syrup polymer S1.

TABLE 5

Curable Adhesive Compositions for Examples 1-17 and Comparative Examples C1-C7

| Examples | Syrup-S1 (wt. %) | TRIAZINE (wt. %) | IRGACURE 651 (wt. %) | HT-1 (wt. %) | HT-2 (wt. %) | HT-3 (wt. %) | HT-4 (wt. %) | HT-5 (wt. %) | HT-6 (wt. %) | HT-7 (wt. %) | LT-2 (wt. %) | TH130 (wt. %) |
|---|---|---|---|---|---|---|---|---|---|---|---|---|
| C1 | 100.0 | 0.24 | 0.20 | | | | | | | | | 20.0 |
| C2 | | 0.18 | | 5.0 | | | | | | | 15.0 | |
| C3 | | | | 10.0 | | | | | | | 10.0 | |
| C4 | | | | 15.0 | | | | | | | 5.0 | |
| 1 | | | | | 5.0 | | | | | | 15.0 | |
| 2 | | | | | 10.0 | | | | | | 10.0 | |
| 3 | | | | | 15.0 | | | | | | 5.0 | |
| 4 | | | | | | 5.0 | | | | | 15.0 | |
| 5 | | | | | | 10.0 | | | | | 10.0 | |
| 6 | | | | | | 15.0 | | | | | 5.0 | |
| 7 | | | | | | | 5.0 | | | | 15.0 | |
| 8 | | | | | | | 10.0 | | | | 10.0 | |
| C5 | | | | | | | | 20.0 | | | | |
| 9 | | | | | | | | 5.0 | | | 15.0 | |
| 10 | | | | | | | | 10.0 | | | 10.0 | |
| 11 | | | | | | | | 15.0 | | | 5.0 | |
| C6 | | | | | | | | | 20.0 | | | |
| 12 | | | | | | | | | 5.0 | | 15.0 | |
| 13 | | | | | | | | | 10.0 | | 10.0 | |
| 14 | | | | | | | | | 15.0 | | 5.0 | |
| C7 | | | | | | | | | | 20.0 | | |
| 15 | | | | | | | | | | 5.0 | 15.0 | |
| 16 | | | | | | | | | | 10.0 | 10.0 | |
| 17 | | | | | | | | | | 15.0 | 5.0 | |

The curable adhesive compositions were then coated between the release sides of two pieces of CP Film T10 PET transparent release film and irradiated using the above-referenced low intensity UV source for 5-10 minutes until the composition was cured. The coating thickness was controlled to be 0.05 mm. The prepared adhesive tape was subjected to the relevant tests after being held at 23±2° C. and 50±5% RH for one day. The detailed testing data are in Table 6.

TABLE 6

Adhesive Properties of Examples 1-17 and Comparative Examples C1-C7

| Examples | Peel-SS (N/mm) | | | Peel-PC (N/mm) | | | Peel-PP (N/mm) | | | 70° C. Shear (min) | FM |
|---|---|---|---|---|---|---|---|---|---|---|---|
|  | Cond. A | Cond. B | Cond. C | Cond. A | Cond. B | Cond. C | Cond. A | Cond. B | Cond. C | | |
| C1 | 0.66 | 1.01 | 0.64 | 0.76 | 0.99 | 0.75 | 0.62 | 0.71 | 0.65 | 5,639 | CF |
| C2 | 0.67 | 0.75 | 0.71 | 0.67 | 0.70 | 0.72 | 0.58 | 0.66 | 0.59 | 2,570 | PO |
| C3 | 0.71 | 0.73 | 0.71 | 0.74 | 0.72 | 0.78 | 0.59 | 0.67 | 0.58 | 4,526 | PO |
| C4 | 0.74 | 0.77 | 0.69 | 0.77 | 0.77 | 0.83 | 0.66 | 0.74 | 0.70 | 4,049 | PO |
| 1 | 0.86 | 0.96 | 0.82 | 0.81 | 0.88 | 0.80 | 0.65 | 0.66 | 0.63 | 10,000+ | N/A |
| 2 | 0.89 | 0.99 | 0.81 | 0.90 | 0.99 | 0.94 | 0.70 | 0.70 | 0.72 | 10,000+ | N/A |
| 3 | 0.95 | 1.16 | 0.96 | 0.98 | 1.39 | 1.01 | 0.73 | 0.88 | 0.80 | 10,000+ | N/A |
| 4 | 0.67 | 0.86 | 0.78 | 0.86 | 1.00 | 0.82 | 0.65 | 0.81 | 0.68 | 10,000+ | N/A |
| 5 | 0.75 | 1.04 | 0.79 | 0.88 | 1.08 | 0.90 | 0.58 | 0.62 | 0.58 | 10,000+ | N/A |
| 6 | 0.84 | 1.17 | 0.85 | 0.96 | 1.46 | 1.00 | 0.57 | 0.72 | 0.59 | 10,000+ | N/A |
| 7 | 0.64 | 0.89 | 0.79 | 0.68 | 1.22 | 0.74 | 0.71 | 0.86 | 0.69 | 10,000+ | N/A |
| 8 | 0.56 | 0.80 | 0.67 | 0.67 | 0.94 | 0.71 | 0.65 | 0.68 | 0.58 | 10,000+ | N/A |
| C5 | 0.41 | 0.56 | 0.50 | 0.57 | 0.74 | 0.56 | 0.41 | 0.38 | 0.33 | 10,000+ | N/A |
| 9 | 0.72 | 0.84 | 0.74 | 0.79 | 1.05 | 0.84 | 0.65 | 0.67 | 0.66 | 10,000+ | N/A |
| 10 | 0.61 | 0.67 | 0.59 | 0.74 | 0.93 | 0.71 | 0.55 | 0.54 | 0.57 | 10,000+ | N/A |
| 11 | 0.57 | 0.62 | 0.57 | 0.71 | 0.93 | 0.63 | 0.54 | 0.54 | 0.49 | 10,000+ | N/A |
| C6 | 0.39 | 0.52 | 0.46 | 0.53 | 0.69 | 0.51 | 0.38 | 0.40 | 0.37 | 10,000+ | N/A |
| 12 | 0.69 | 0.76 | 0.70 | 0.76 | 0.94 | 0.78 | 0.61 | 0.65 | 0.60 | 10,000+ | N/A |
| 13 | 0.60 | 0.64 | 0.57 | 0.69 | 0.86 | 0.68 | 0.50 | 0.53 | 0.51 | 10,000+ | N/A |
| 14 | 0.53 | 0.59 | 0.52 | 0.61 | 0.79 | 0.60 | 0.43 | 0.47 | 0.42 | 10,000+ | N/A |
| C7 | 0.35 | 0.47 | 0.40 | 0.48 | 0.61 | 0.48 | 0.33 | 0.37 | 0.32 | 10,000+ | N/A |
| 15 | 0.57 | 0.64 | 0.61 | 0.62 | 0.73 | 0.61 | 0.51 | 0.58 | 0.53 | 10,000+ | N/A |
| 16 | 0.53 | 0.59 | 0.55 | 0.58 | 0.68 | 0.62 | 0.49 | 0.52 | 0.49 | 10,000+ | N/A |
| 17 | 0.46 | 0.55 | 0.47 | 0.54 | 0.60 | 0.53 | 0.44 | 0.48 | 0.43 | 10,000+ | N/A |

As shown in Tables 5 and 6:

No high glass transition temperature acrylate polymer tackifiers and low glass transition temperature acrylate polymer tackifiers were included in comparative example C1, so its high temperature (70° C.) shearing property was poor.

The weight average molecular weight of the high glass transition temperature acrylate polymer tackifiers in comparative examples C2, C3, and C4 were 6,329 grams/mole (Daltons), lower than 10,000 grams/mole (Daltons), so the high temperature (70° C.) shearing properties of comparative examples C2, C3, and C4 were poor.

Only the high glass transition temperature acrylate polymer tackifiers were included in comparative example C5 without low glass transition temperature acrylate polymer tackifiers. 20% high glass transition temperature acrylate polymer tackifiers were included in comparative example C5, and the total amounts of both high and low glass transition temperature acrylate polymer tackifiers in examples 9, 10 and 11 were also 20%, all of which showed higher peel adhesion than comparative example C5. Therefore, on the condition of high glass transition temperature acrylate polymer tackifiers with same type and the same total amount of the acrylate polymer tackifier, the pressure-sensitive adhesive (the cured adhesive composition) containing both high and low glass transition temperature acrylate polymer tackifiers has higher peel adhesion.

Only the high glass transition temperature acrylate polymer tackifiers were included in comparative example C6 without low glass transition temperature acrylate polymer tackifiers 20% high glass transition temperature acrylate polymer tackifiers were included in comparative example C6, and the total amounts of both high and low glass transition temperature acrylate polymer tackifiers in examples 12, 13 and 14 were also 20%, all of which showed higher peel adhesion than comparative example C6. Therefore, on the condition of high glass transition temperature acrylate polymer tackifiers with same type and the same total amount of the acrylate polymer tackifier, the pressure-sensitive adhesive (the cured adhesive composition) containing both high and low glass transition temperature acrylate polymer tackifiers has higher peel adhesion.

Only the high glass transition temperature acrylate polymer tackifiers were included in comparative example C7 without low glass transition temperature acrylate polymer tackifiers. 20% high glass transition temperature acrylate polymer tackifiers were included in comparative example C7, and the total amounts of both high and low glass transition temperature acrylate polymer tackifiers in examples 15, 16 and 17 were also 20%, all of which showed higher peel adhesion than comparative example C7. Therefore, on the condition of high glass transition temperature acrylate polymer tackifiers with same type and the same total amount of the acrylate polymer tackifier, the pressure-sensitive adhesive (the cured adhesive composition) containing both high and low glass transition temperature acrylate polymer tackifiers has higher peel adhesion.

Examples 18-28 and Comparative Examples C8-C10: Cured Adhesive Compositions

Comparative examples C8-C10 and Examples 18-28 were prepared from the curable adhesive compositions shown in Table 7. The syrup polymer S2, crosslink TRIAZINE, the photoinitiator IRGACURE 651 and other additives were charged to 1 quart glass jar. After closing each jar with a cap, the resulting mixtures were placed onto a three roller machine to mix until all the components were completely dissolved. The resulting curable adhesive compositions were clear and transparent. Each weight percent in Table 7 was based on the total weight of the syrup polymer S2.

TABLE 7

Curable Adhesive Compositions for Examples 18-28 and Comparative Examples C8-C10

| Examples | Syrup-S2 (wt. %) | TRIAZINE (wt. %) | PETA (wt. %) | IRGACURE 651 (wt. %) | HT-8 (wt. %) | HT-9 (wt. %) | HT-10 (wt. %) | HT-11 (wt. %) | HT-12 (wt. %) |
|---|---|---|---|---|---|---|---|---|---|
| 18 | 100.0 | 0.10 | 0.05 | 0.20 | 8.0 | | | | |
| 19 | | | | | | 8.0 | | | |
| 20 | | | | | | | 8.0 | | |
| 21 | | | | | | | | 8.0 | |
| 22 | | | | | | | | | 8.0 |
| 23 | | | | | | | | | |
| 24 | | | | | | | | | |
| 25 | | | | | | | | | |
| C8 | | | | | | | | | |
| C9 | | | | | | | | | |
| C10 | | | | | | | | | |
| 26 | | | | | 2.0 | | | | |
| 27 | | | | | 5.0 | | | | |
| 28 | | 0.18 | 0.08 | | 3.0 | | | | |

| Examples | HT-13 (wt. %) | HT-14 (wt. %) | HT-15 (wt. %) | HT-16 (wt. %) | HT-17 (wt. %) | HT-18 (wt. %) | LT-1 (wt. %) | FORAL 85LB (wt. %) |
|---|---|---|---|---|---|---|---|---|
| 18 | | | | | | | 2.0 | |
| 19 | | | | | | | 2.0 | |
| 20 | | | | | | | 2.0 | |
| 21 | | | | | | | 2.0 | |
| 22 | | | | | | | 2.0 | |
| 23 | 8.0 | | | | | | 2.0 | |
| 24 | | 8.0 | | | | | 2.0 | |
| 25 | | | 8.0 | | | | 2.0 | |
| C8 | | | | 8.0 | | | 2.0 | |
| C9 | | | | | 8.0 | | 2.0 | |
| C10 | | | | | | 8.0 | 2.0 | |
| 26 | | | | | | | 8.0 | |
| 27 | | | | | | | 5.0 | |
| 28 | | | | | | | 2.0 | 15.0 |

The curable adhesive compositions were then coated between the release sides of two pieces of CP Film T10 PET transparent release film and irradiated using the above-referenced low intensity UV source for 5-10 minutes until the composition was cured. The coating thickness of example 28 was 0.2 mm. Except example 28, the coating thickness of others was controlled to be 0.05 mm. The prepared adhesive tape was subjected to the relevant tests after being held at 23±2° C. and 50±5% RH for one day. The detailed testing data are in Table 8.

TABLE 8

Adhesive Properties of Examples 18-28 and Comparative Examples C8-C10

| Examples | Peel-SS (N/mm) Cond. A | Peel-SS (N/mm) Cond. B | Peel-SS (N/mm) Cond. C | Peel-PC (N/mm) Cond. A | Peel-PC (N/mm) Cond. B | Peel-PC (N/mm) Cond. C | Peel-PP (N/mm) Cond. A | Peel-PP (N/mm) Cond. B | Peel-PP (N/mm) Cond. C | 70° C. Shear (min) | FM |
|---|---|---|---|---|---|---|---|---|---|---|---|
| 18 | 0.79 | 1.22 | 0.81 | 0.69 | 0.90 | 0.68 | 0.57 | 0.63 | 0.60 | 10,000+ | N/A |
| 19 | 0.86 | 1.32 | 0.87 | 0.75 | 0.98 | 0.77 | 0.63 | 0.71 | 0.65 | 10,000+ | N/A |
| 20 | 0.91 | 1.39 | 0.90 | 0.80 | 1.10 | 0.81 | 0.69 | 0.78 | 0.71 | 10,000+ | N/A |
| 21 | 0.99 | 1.49 | 1.01 | 0.87 | 1.16 | 0.89 | 0.78 | 0.89 | 0.77 | 10,000+ | N/A |
| 22 | 0.95 | 1.34 | 0.92 | 0.79 | 1.07 | 0.78 | 0.72 | 0.79 | 0.73 | 10,000+ | N/A |
| 23 | 0.76 | 1.10 | 0.77 | 0.68 | 0.86 | 0.65 | 0.56 | 0.64 | 0.55 | 10,000+ | N/A |
| 24 | 0.65 | 0.89 | 0.64 | 0.58 | 0.69 | 0.56 | 0.45 | 0.53 | 0.46 | 10,000+ | N/A |
| 25 | 0.63 | 0.82 | 0.62 | 0.56 | 0.63 | 0.56 | 0.40 | 0.48 | 0.37 | 10,000+ | N/A |
| C8 | 0.52 | 0.60 | 0.54 | 0.50 | 0.59 | 0.51 | 0.25 | 0.35 | 0.24 | 8,735 | PO |
| C9 | 0.40 | 0.46 | 0.42 | 0.39 | 0.47 | 0.40 | 0.20 | 0.26 | 0.18 | 3,268 | PO |
| C10 | 0.51 | 0.62 | 0.54 | 0.53 | 0.65 | 0.51 | 0.22 | 0.30 | 0.23 | 1,271 | CF |
| 26 | 0.63 | 1.05 | 0.75 | 0.60 | 0.75 | 0.65 | 0.28 | 0.40 | 0.32 | 10,000+ | N/A |
| 27 | 0.71 | 1.16 | 0.73 | 0.69 | 0.84 | 0.71 | 0.28 | 0.51 | 0.36 | 10,000+ | N/A |
| 28 | 1.18 | 1.52 | 1.16 | 0.93 | 1.24 | 0.90 | 0.71 | 0.81 | 0.69 | 10,000+ | N/A |

As shown in Tables 7 and 8:

The weight average molecular weight of the high glass transition temperature acrylate polymer tackifiers in comparative example C8 was 152,097 grams/mole (Daltons), higher than 150,000 grams/mole (Daltons), so its high temperature (70° C.) shearing property was poor.

The weight average molecular weight of the high glass transition temperature acrylate polymer tackifiers in comparative example C9 was 206,073 grams/mole (Daltons), higher than 150,000 grams/mole (Daltons), so its high temperature (70° C.) shearing property was poor.

The Tg of the high glass transition temperature acrylate polymer tackifier in comparative example C10 was 1.5° C., lower than 5° C., so its high temperature (70° C.) shearing property was poor.

Examples 29-37 and Comparative Examples C11-C14: Cured Adhesive Compositions

Comparative examples C11-C14 and Examples 29-37 were prepared from the curable adhesive compositions shown in Table 9. The syrup polymer S3, crosslink TRIAZINE, the photoinitiator IRGACURE 651 and other additives were charged to 1 quart glass jar. After closing each jar with a cap, the resulting mixtures were placed onto a three roller machine to mix until all the components were completely dissolved. The resulting curable adhesive compositions were clear and transparent. Each weight percent in Table 9 was based on the total weight of the syrup polymer S3.

TABLE 9

Curable Adhesive Compositions for Examples 29-37 and Comparative Examples C11-C14

| Examples | Syrup-S3 (wt. %) | TRIAZINE (wt. %) | HDDA (wt. %) | IRGACURE 651 (wt. %) | HT-8 (wt. %) | HT-18 (wt. %) | HT-19 (wt. %) | LT-1 (wt. %) | LT-3 (wt. %) | LT-4 (wt. %) |
|---|---|---|---|---|---|---|---|---|---|---|
| 29 | 100.0 | 0.08 | 0.10 | 0.20 | | | 18.0 | 6.0 | | |
| 30 | | | | | 18.0 | | | 6.0 | | |
| C11 | | | | | 18.0 | | | | 6.0 | |
| C12 | | | | | 18.0 | | | | | 6.0 |
| 31 | | | | | 18.0 | | | | | |
| 32 | | | | | 18.0 | | | | | |
| 33 | | | | | 18.0 | | | | | |
| 34 | | | | | 18.0 | | | | | |
| 35 | | | | | 18.0 | | | | | |
| 36 | | | | | 18.0 | | | | | |
| C13 | | | | | 18.0 | | | | | |
| C14 | | | | | 18.0 | | | | | |
| 37 | | 0.15 | 0.12 | 0.24 | | | 16.0 | 4.0 | | |

| Examples | LT-5 (wt. %) | LT-6 (wt. %) | LT-7 (wt. %) | LT-8 (wt. %) | LT-9 (wt. %) | LT-10 (wt. %) | LT-11 (wt. %) | LT-12 (wt. %) | REGALREZ 6108 (wt. %) |
|---|---|---|---|---|---|---|---|---|---|
| 29 | | | | | | | | | |
| 30 | | | | | | | | | |
| C11 | | | | | | | | | |
| C12 | | | | | | | | | |
| 31 | 6.0 | | | | | | | | |
| 32 | | 6.0 | | | | | | | |
| 33 | | | 6.0 | | | | | | |
| 34 | | | | 6.0 | | | | | |
| 35 | | | | | 6.0 | | | | |
| 36 | | | | | | 6.0 | | | |
| C13 | | | | | | | 6.0 | | |
| C14 | | | | | | | | 6.0 | |
| 37 | | | | | | | | | 8.0 |

The curable adhesive compositions were then coated between the release sides of two pieces of CP Film T10 PET transparent release film and irradiated using the above-referenced low intensity UV source for 5-10 minutes until the composition was cured. The coating thickness of example 37 was 0.1 mm. Except example 37, the coating thickness of others was controlled to be 0.05 mm. The prepared adhesive tape was subjected to the relevant tests after being held at 23±2° C. and 50±5% RH for one day. The detailed testing data are in Table 10.

TABLE 10

Adhesive Properties of Examples 29-37 and Comparative Examples C11-C14

| Examples | Peel-SS (N/mm) | | | Peel-PC (N/mm) | | | Peel-PP (N/mm) | | | 70° C. Shear | |
|---|---|---|---|---|---|---|---|---|---|---|---|
| | Cond. A | Cond. B | Cond. C | Cond. A | Cond. B | Cond. C | Cond. A | Cond. B | Cond. C | (min) | FM |
| 29 | 0.73 | 0.78 | 0.69 | 0.88 | 1.06 | 0.83 | 0.88 | 1.12 | 0.83 | 10,000+ | N/A |
| 30 | 0.67 | 0.74 | 0.58 | 0.80 | 0.88 | 0.78 | 0.72 | 0.83 | 0.73 | 10,000+ | N/A |
| C11 | 0.43 | 0.46 | 0.41 | 0.49 | 0.53 | 0.47 | 0.58 | 0.62 | 0.55 | 1,097 | CF |
| C12 | 0.52 | 0.57 | 0.53 | 0.52 | 0.58 | 0.51 | 0.65 | 0.74 | 0.73 | 7,542 | PO |
| 31 | 0.61 | 0.68 | 0.59 | 0.58 | 0.67 | 0.59 | 0.73 | 0.86 | 0.73 | 10,000+ | N/A |
| 32 | 0.67 | 0.77 | 0.66 | 0.65 | 0.78 | 0.63 | 0.82 | 0.93 | 0.84 | 10,000+ | N/A |
| 33 | 0.63 | 0.71 | 0.64 | 0.62 | 0.69 | 0.64 | 0.80 | 0.89 | 0.78 | 10,000+ | N/A |
| 34 | 0.56 | 0.62 | 0.53 | 0.57 | 0.64 | 0.53 | 0.73 | 0.79 | 0.72 | 10,000+ | N/A |
| 35 | 0.50 | 0.56 | 0.52 | 0.52 | 0.58 | 0.51 | 0.64 | 0.70 | 0.62 | 10,000+ | N/A |
| 36 | 0.47 | 0.52 | 0.45 | 0.45 | 0.55 | 0.48 | 0.49 | 0.59 | 0.48 | 10,000+ | N/A |
| C13 | 0.37 | 0.47 | 0.36 | 0.36 | 0.43 | 0.35 | 0.36 | 0.45 | 0.34 | 7,643 | PO |
| C14 | 0.31 | 0.39 | 0.29 | 0.33 | 0.38 | 0.34 | 0.31 | 0.37 | 0.32 | 6,539 | PO |
| 37 | 0.83 | 0.92 | 0.81 | 0.95 | 1.18 | 0.94 | 0.97 | 1.20 | 0.99 | 10,000+ | N/A |

As shown in Tables 9 and 10:

The weight average molecular weight of the low glass transition temperature acrylate polymer tackifiers in comparative example was C11 7,523 grams/mole (Daltons), lower than 150,000 grams/mole (Daltons), so its high temperature (70° C.) shearing property was poor.

The weight average molecular weight of the low glass transition temperature acrylate polymer tackifiers in comparative example C12 was 12,576 grams/mole (Daltons), lower than 150,000 grams/mole (Daltons), so its high temperature (70° C.) shearing property was poor.

The weight average molecular weight of the low glass transition temperature acrylate polymer tackifiers in comparative example C13 was 123,785 grams/mole (Daltons), higher than 120,000 grams/mole (Daltons), so its high temperature (70° C.) shearing property was poor.

The weight average molecular weight of the low glass transition temperature acrylate polymer tackifiers in comparative example C14 was 149,246 grams/mole (Daltons), higher than 120,000 grams/mole (Daltons), so its high temperature (70° C.) shearing property was poor.

Examples 38-42: Cured Adhesive Compositions

Examples 38-42 were prepared from the curable adhesive compositions shown in Table 11. The syrup polymer S4, crosslink TRIAZINE, the photoinitiator IRGACURE 651 and other additives were charged to 1 quart glass jar. After closing each jar with a cap, the resulting mixtures were placed onto a three roller machine to mix until all the components were completely dissolved. The resulting curable adhesive compositions were clear and transparent. Each weight percent in Table 11 was based on the total weight of the syrup polymer S4.

TABLE 11

Curable Adhesive Compositions for Examples 38-42

| Examples | Syrup-S4 (wt. %) | TRIAZINE (wt. %) | HDDA (wt. %) | IRGACURE 651 (wt. %) | HT-3 (wt. %) | LT-6 (wt. %) | LT-13 (wt. %) | LT-14 (wt. %) |
|---|---|---|---|---|---|---|---|---|
| 38 | 100.0 | 0.18 | 0.12 | 0.24 | 29.0 | 6.0 | | |
| 39 | | | | | 25.0 | | 5.0 | |
| 40 | | | | | 25.0 | | | 5.0 |
| 41 | | 0.06 | | 0.10 | 3.0 | | | 2.0 |
| 42 | | | | | 5.0 | | | |

The curable adhesive compositions were then coated between the release sides of two pieces of CP Film T10 PET transparent release film and irradiated using the above-referenced low intensity UV source for 5-10 minutes until the composition was cured. The coating thickness of examples 38-40 was controlled to be 0.15 mm. The coating thickness of examples 41-42 was controlled to be 0.25 mm. The prepared adhesive tape was subjected to the relevant tests after being held at 23±2° C. and 50±5% RH for one day. The detailed testing data are in Table 12.

TABLE 12

Adhesive Properties of Examples 38-42

| Examples | Peel-SS (N/mm) | | | Peel-PC (N/mm) | | | Peel-PP (N/mm) | | | 70° C. Shear (min) | FM |
|---|---|---|---|---|---|---|---|---|---|---|---|
| | Cond. A | Cond. B | Cond. C | Cond. A | Cond. B | Cond. C | Cond. A | Cond. B | Cond. C | | |
| 38 | 1.34 | 1.60 | 1.35 | 1.06 | 1.21 | 0.99 | 0.55 | 0.67 | 0.53 | 10,000+ | N/A |
| 39 | 1.23 | 1.56 | 1.25 | 1.12 | 1.32 | 1.08 | 0.51 | 0.64 | 0.49 | 10,000+ | N/A |
| 40 | 1.18 | 1.42 | 1.17 | 0.98 | 1.24 | 0.98 | 0.47 | 0.55 | 0.48 | 10,000+ | N/A |
| 41 | 0.98 | 1.29 | 1.01 | 0.81 | 1.02 | 0.84 | 0.36 | 0.47 | 0.35 | 10,000+ | N/A |
| 42 | 0.87 | 1.17 | 0.90 | 0.75 | 0.89 | 0.76 | 0.32 | 0.40 | 0.34 | 10,000+ | N/A |

In conclusion, the present methods of preparing the pressure-sensitive adhesives feature low energy consumption, high speed in applying, without (or with minimal amounts of) organic solvents. The pressure-sensitive adhesives prepared according to the present methods of preparing the pressure-sensitive adhesives have good adhesiveness and high temperature shearing properties.

The invention claimed is:

1. A curable adhesive composition comprising:
   (a) a first syrup polymer formed from a first reaction mixture, the first reaction mixture comprising
      (1) a non-tertiary alkyl acrylate; and
      (2) an acid-functionalized ethylenically unsaturated monomer; and
   wherein the first syrup polymer comprises
      (i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons); and
      (ii) 70 to 99 weight percent of un-reacted monomers based on the total weight of monomers in the first reaction mixture; and
   (b) a high glass transition temperature (meth)acrylate polymer tackifier having a glass transition temperature of at least 5° C.; and
   (c) a low glass transition temperature (meth)acrylate polymer tackifier having a glass transition temperature no greater than 0° C.; and
   (d) an ultraviolet photoinitiator.

2. The curable adhesive composition of claim 1, wherein the weight average molecular weight of the high glass transition temperature (meth)acrylate polymer tackifier is in a range of 10,000 to 150,000 grams/mole (Daltons).

3. The curable adhesive composition of claim 1, wherein the weight average molecular weight of the low glass transition temperature (meth)acrylate polymer tackifier is in a range of 15,000 to 120,000 grams/mole (Daltons).

4. The curable adhesive composition of claim 1, wherein the curable adhesive composition comprises 2 to 29 weight percent high glass transition temperature (meth)acrylate polymer tackifier based on a total weight of the first syrup polymer.

5. The curable adhesive composition of claim 1, wherein the curable adhesive composition comprises 2 to 15 weight percent low glass transition temperature (meth)acrylate polymer tackifier based on a total weight of the first syrup polymer.

6. The curable adhesive composition of claim 2, wherein the weight average molecular weight of the high glass transition temperature(meth)acrylate polymer tackifier is in a range of 10,000 to 100,000 grams/mole (Daltons).

7. The curable adhesive composition of claim 3, wherein the weight average molecular weight of the low glass transition temperature(meth)acrylate polymer tackifier is in a range of 15,000 to 90,000 grams/mole (Daltons).

8. The curable adhesive composition of claim 1, wherein the glass transition temperature of the high glass transition temperature(meth)acrylate polymer tackifier is at least 10° C.

9. The curable adhesive composition of claim 1, wherein the glass transition temperature of the low glass transition temperature (meth)acrylate polymer tackifier is no greater than −10° C.

10. The curable adhesive composition of claim 1, wherein the first reaction mixture comprises 45 to 99.5 weight percent of the non-tertiary alkyl acrylate.

11. The curable adhesive composition of claim 1, wherein the first reaction mixture comprises
   (1) 45 to 99.5 weight percent of the non-tertiary alkylacrylate;
   (2) 0.5 to 15 weight percent of an acid-functionalized ethylenically unsaturated monomer;
   (3) 0 to 40 weight percent of an optional a high glass transition temperature (meth)acrylate monomer whose glass transition temperature is higher than the value of the glass transition temperature of the non-tertiary alkyl acrylate monomer;
   (4) 0 to 10 weight percent of an optional non-acidic ethylenically unsaturated polar monomer;
   (5) 0 to 5 weight percent of an optional other vinyl monomers; and
   (6) 0 to 5 weight percent of an optional multi-functional (meth)acrylate monomer,
wherein each weight percent is based on a total weight of monomers in the first reaction mixture.

12. The curable adhesive composition of claim 11, wherein the first reaction mixture comprises
   (1) 85 to 99.5 weight percent of a sum of the non-tertiary alkyl acrylate and the optional high glass transition temperature (meth)acrylate monomer; and
   (2) 0.5 to 15 weight percent of the acid-functionalized ethylenically unsaturated monomer.

13. The curable adhesive composition of claim 1, wherein the low glass transition temperature(meth)acrylate polymer tackifier is formed from a second reaction mixture comprising
   (1) 30 to 99.5 weight percent of a non-tertiary alkyl acrylate;
   (2) 0.5 to 15 weight percent of an acid-functionalized ethylenically unsaturated monomer;
   (3) 0 to 60 weight percent of an optional high glass transition temperature (meth)acrylate monomer whose glass transition temperature is higher than the value of the glass transition temperature of the non-tertiary alkyl acrylate monomer;

(4) 0 to 40 weight percent of an optional non-acidic ethylenically unsaturated polar monomer; and
(5) 0 to 40 weight percent of optional other vinyl monomers; and
(6) 0 to 5 weight percent of an optional multi-functional (meth)acrylate monomer, wherein each weight percent is based on a total weight of monomers in the second reaction mixture.

14. The curable adhesive composition of claim 1, wherein the high glass transition temperature (meth)acrylate polymer tackifier is formed from a third reaction mixture comprising
(1) 30 to 99.5 weight percent of a non-tertiary alkyl acrylate;
(2) 0.5 to 15 weight percent of an acid-functionalized ethylenically unsaturated monomer;
(3) 0 to 60 weight percent of an optional high glass transition temperature (meth)acrylate monomer whose glass transition temperature is higher than the value of the glass transition temperature of the non-tertiary alkyl acrylate monomer;
(4) 0 to 40 weight percent of an optional non-acidic ethylenically unsaturated polar monomer; and
(5) 0 to 40 weight percent of optional other vinyl monomers; and
(6) 0 to 5 weight percent of an optional multi-functional (meth)acrylate monomer, wherein each weight percent is based on a total weight of monomers in the third reaction mixture.

15. The curable adhesive composition of claim 13, wherein the low glass transition temperature(meth)acrylate polymer tackifier is in the form of a second syrup polymer that comprises
(i) 70 to 99.5 weight percent of a partially polymerized (meth)acrylate tackifier based on a total weight of monomers in the second reaction mixture; and
(ii) 0.5 to 30 weight percent un-reacted monomers, wherein each weight percent is based on a total weight of monomers in the second reaction mixture.

16. The curable adhesive composition of claim 14, wherein the high glass transition temperature(meth)acrylate polymer tackifier is in the form of a completely polymerized material that comprises
(i) 90 to 99.9 weight percent of a partially polymerized (meth)acrylate tackifier based on a total weight of monomers in the third reaction mixture; and
(ii) 0.1 to 10 weight percent un-reacted monomers, wherein each weight percent is based on a total weight of monomers in the third reaction mixture.

17. The curable adhesive composition of claim 1, further comprising a third tackifier resin that is different than the high glass transition temperature(meth)acrylate polymer tackifier and the low glass transition temperature(meth)acrylate polymer tackifier.

18. The curable adhesive composition of claim 17, wherein the third tackifier can be selected from the group consisting of a hydrocarbon resin tackifier, a hydrogenated terpene phenol resin tackifier and hydrogenated rosin tackifier.

19. The curable adhesive composition of claim 1, further comprising a photo-sensitive crosslinker.

20. The curable adhesive composition of claim 1, wherein the weight average molecular weight of the partially polymerized acid-functionalized (meth)acrylate copolymer is greater than 1,000,000 grams/mole (Daltons).

21. A cured adhesive composition comprising a ultraviolet cured reaction product of a curable adhesive composition comprising:

(a) a first syrup polymer formed from a first reaction mixture, the first reaction mixture comprising
(1) a non-tertiary alkyl acrylate; and
(2) an acid-functionalized ethylenically unsaturated monomer, wherein the first syrup polymer comprises
(i) 1 to 30 weight percent of a partially polymerized acid-functionalized (meth)acrylate copolymer based on a total weight of monomers in the first reaction mixture, wherein the partially polymerized acid-functionalized (meth)acrylate copolymer has a weight average molecular weight greater than 500,000 grams/mole (Daltons); and
(ii) 70 to 99 weight percent of un-reacted monomers based on the total weight of monomers in the first reaction mixture; and (b) a high glass transition temperature (meth)acrylate polymer tackifier having a glass transition temperature of at least 5° C.; and
(c) a low glass transition temperature (meth)acrylate polymer tackifier having a glass transition temperature no greater than 0° C.; and
(d) an ultraviolet photoinitiator, wherein the cured adhesive composition is a pressure-sensitive adhesive.

22. A pressure-sensitive adhesive comprising:
(a) an acid-functionalized (meth)acrylate copolymer having a weight average molecular weight greater than 500,000 grams/mole (Daltons); and
(b) a high glass transition temperature(meth)acrylate polymer tackifier having a glass transition temperature of at least 5° C.; and
(c) a low glass transition temperature (meth)acrylate polymer tackifier having a glass transition temperature no greater than 0° C.

23. The pressure-sensitive adhesive of claim 22, wherein the pressure-sensitive adhesive comprises 2 to 29 weight percent high glass transition temperature (meth)acrylate polymer tackifier based on a total weight of the pressure-sensitive adhesive.

24. The pressure-sensitive adhesive of claim 22, wherein the pressure-sensitive adhesive comprises 2 to 15 weight percent low glass transition temperature (meth)acrylate polymer tackifier based on a total weight of the pressure-sensitive adhesive.

25. The pressure-sensitive adhesive of claim 22, wherein the weight average molecular weight of the high glass transition temperature (meth)acrylate polymer tackifier is in a range of 10,000 to 150,000 grams/mole (Daltons).

26. The pressure-sensitive adhesive of claim 22, wherein the weight average molecular weight of the low glass transition temperature (meth)acrylate polymer tackifier is in a range of 15,000 to 120,000 grams/mole (Daltons).

27. The pressure-sensitive adhesive of claim 25, wherein the weight average molecular weight of the high glass transition temperature (meth)acrylate polymer tackifier is in a range of 10,000 to 100,000 grams/mole (Daltons).

28. The pressure-sensitive adhesive of claim 26, wherein the weight average molecular weight of the low glass transition temperature (meth)acrylate polymer tackifier is in a range of 15,000 to 90,000 grams/mole (Daltons).

29. The pressure-sensitive adhesive of claim 22, wherein the glass transition temperature of the high glass transition temperature (meth)acrylate polymer tackifier is at least 10° C.

30. The pressure-sensitive adhesive of claim 22, wherein the glass transition temperature of the low glass transition temperature (meth)acrylate polymer tackifier is no greater than −10° C.

* * * * *